(12) United States Patent  (10) Patent No.: US 6,324,345 B1
Enomoto  (45) Date of Patent: *Nov. 27, 2001

(54) PHOTOGRAPHIC FILM WITH RECORDED INFORMATION, METHOD OF ACQUIRING THE INFORMATION RECORDED ON PHOTOGRAPHIC FILM, IMAGE PROCESSING METHOD USING THE ACQUIRED INFORMATION, AND PRINT SYSTEM USING THE SAME

(75) Inventor: Jun Enomoto, Kanagawa (JP)

(73) Assignee: Fuji Photo Film Co., Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/208,589

(22) Filed: Dec. 10, 1998

(30) Foreign Application Priority Data

Dec. 20, 1997 (JP) ........................................ 9-340200

(51) Int. Cl.$^7$ .................................................. G03B 17/24
(52) U.S. Cl. ................................................ 396/311; 355/41
(58) Field of Search ............................. 396/310, 311, 396/315, 317, 318; 430/496, 501; 235/375, 462.05; 355/40, 41

(56) References Cited

U.S. PATENT DOCUMENTS

| 4,914,471 | * | 4/1990 | Saeki et al. ............................. 355/40 |
| 4,918,484 | * | 4/1990 | Ujiie et al. ............................. 355/41 |
| 4,965,628 | * | 10/1990 | Olliver et al. ........................... 355/41 |
| 5,122,645 | * | 6/1992 | Saeki et al. ....................... 235/462.05 |
| 5,128,519 | * | 7/1992 | Tokuda ................................... 235/375 |
| 5,164,574 | * | 11/1992 | Ujiie et al. ....................... 235/462.05 |
| 5,309,199 | * | 5/1994 | Frick ....................................... 355/77 |
| 5,382,508 | * | 1/1995 | Ikenoue ................................ 430/496 |
| 5,493,354 | * | 2/1996 | Watanabe et al. .................... 396/315 |
| 5,671,452 | * | 9/1997 | Seikai ................................... 396/318 |
| 5,761,558 | * | 6/1998 | Patton et al. ......................... 396/429 |
| 5,799,219 | * | 8/1998 | Moghadam et al. ................. 396/319 |
| 5,885,759 | * | 3/1999 | Nakamura ............................ 430/496 |

FOREIGN PATENT DOCUMENTS

A09281613   10/1997   (JP) .

* cited by examiner

Primary Examiner—David M. Gray

(57) ABSTRACT

In addition to a standardized bar code, which contains optically or magnetically recorded film information such as the photographic film type, the manufacturer's name and the frame number, a photographic film is imprinted with a bar code containing additional information not included in the standardized bar code. Specifically, this additional information includes data on the model of a film with lens, a film-characteristic identification number, the print type of the photographic film, and other information useful in specifying image printing and processing conditions. The information with the bar code is recorded in a different location on the photographic film than where the standardized bar code is recorded. This additional information is acquired by optically reading the bar code with an image reading device (i.e., sensor) of an image processing apparatus. Specified image processing steps are performed based on the acquired additional information. Subsequently, the results of the specified image processing steps are outputted as a finished print.

30 Claims, 10 Drawing Sheets

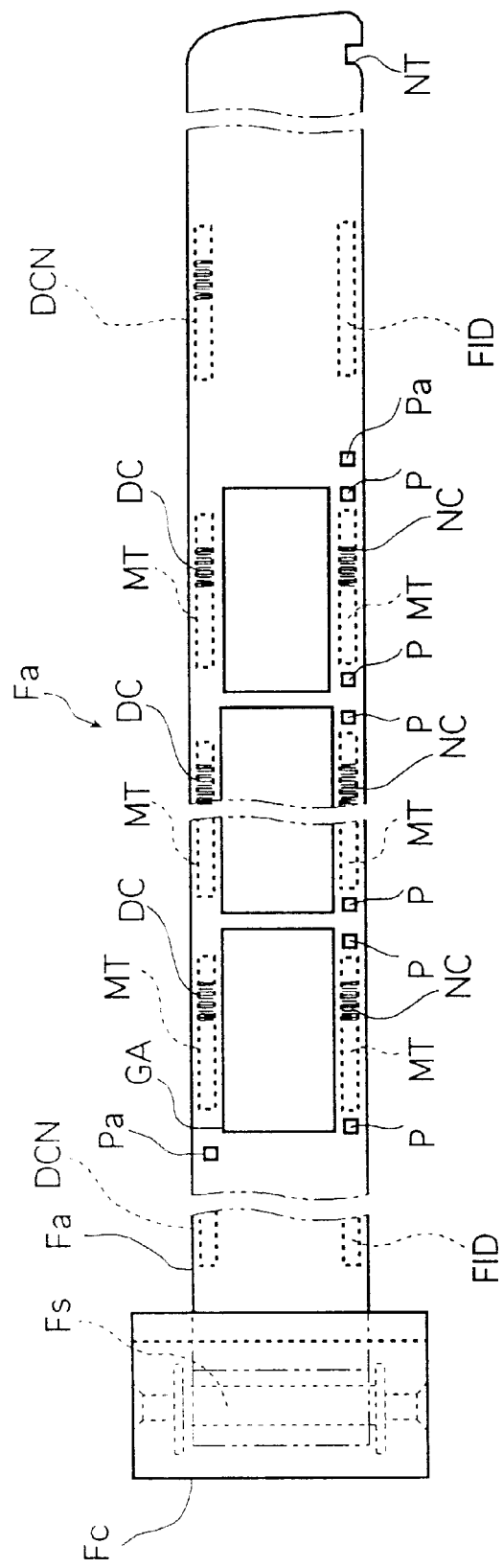

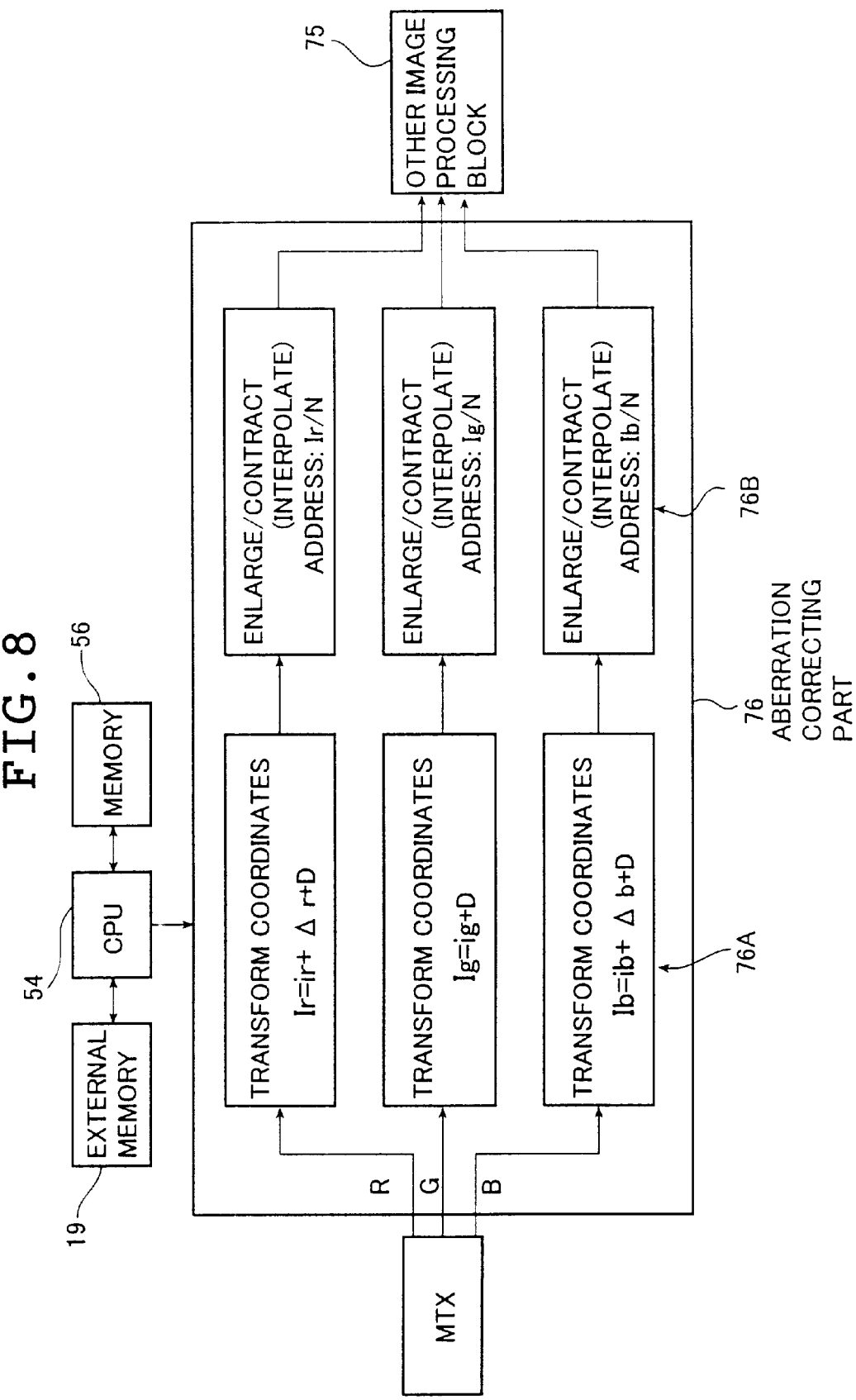

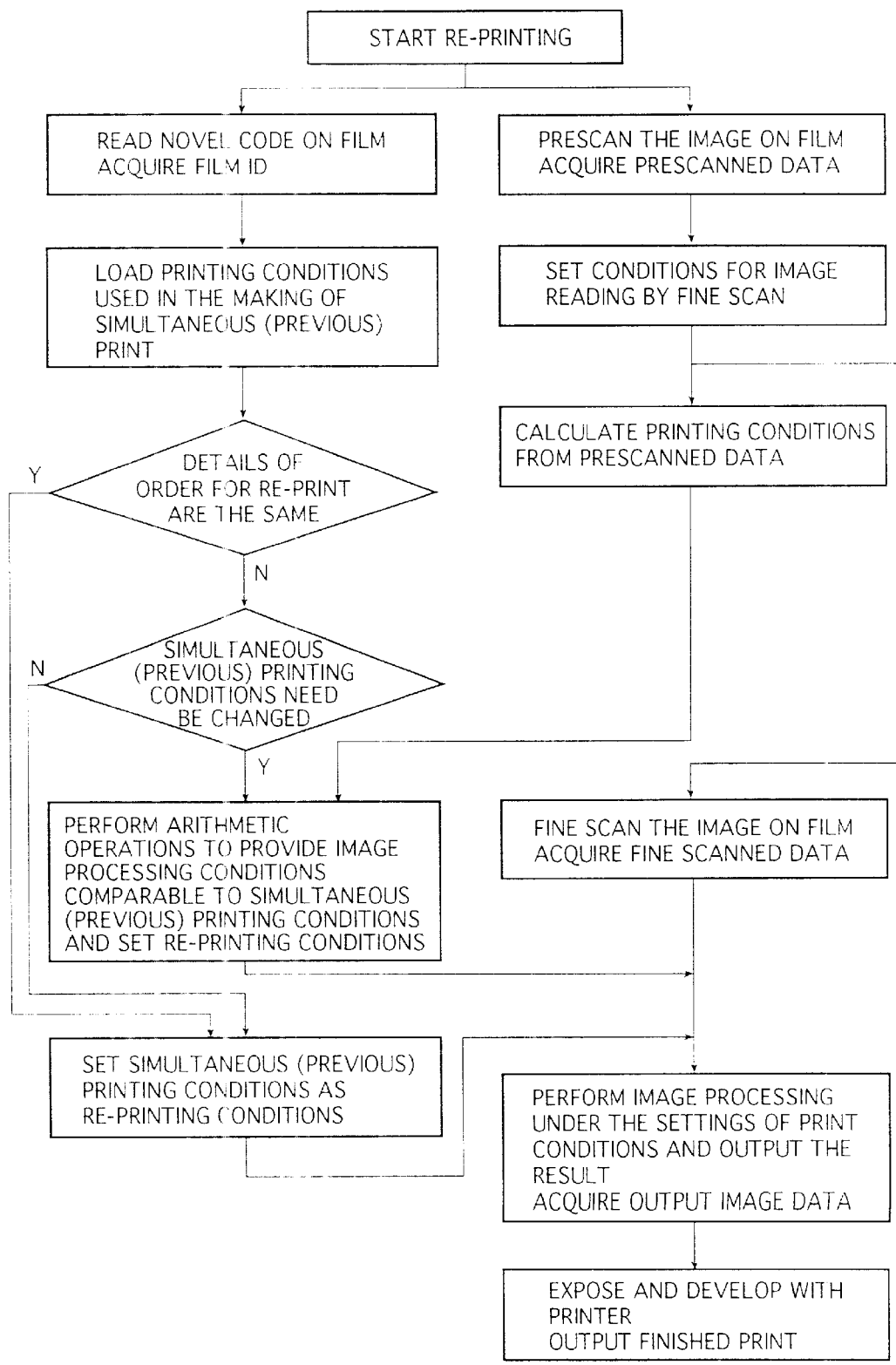

PHOTOGRAPHIC FILM WITH RECORDED INFORMATION, METHOD OF ACQUIRING THE INFORMATION RECORDED ON PHOTOGRAPHIC FILM, IMAGE PROCESSING METHOD USING THE ACQUIRED INFORMATION, AND PRINT SYSTEM USING THE SAME

BACKGROUND OF THE INVENTION

FIELD OF THE INVENTION

The present invention relates to a photographic film having a novel bar code recorded in a different position using the standardized DX coding systems to represent additional information. More particularly, relates to a method of acquiring additional information for performing image processing by reading the novel bar code from the photographic film.

A photoprinter is an apparatus where an image taken with a camera and recorded on a photographic film such as a negative or reversal film (which are hereinafter referred to simply as "film") is printed on photographic paper such as color paper. It is required with the photoprinter that the photographic paper be finished to a print reproducing a high-quality image. To meet this requirement, the conventional analog photoprinter of an areal exposure type performs photometry on the image carried on a film, and printing conditions such as color filter conditions and the amount of exposure that are necessary for printing an image with appropriate colors and densities are determined on the basis of the obtained photometric data. The Assignee recently put a digital photoprinter on the market as an advanced model that performs digitally controlled laser exposure. With this photoprinter, the image carried on a film is photoelectrically read pixel by pixel to produce digital image data, on the basis of which printing conditions such as set-up and image processing conditions are determined in such a way as to print an image of appropriate colors and densities.

However, the emulsion used on films and their base density differ not only between film manufacturers but also between film types. Therefore, when photographic printing is to be done, just determining the printing conditions from photometric and digital image data is insufficient to produce an image having appropriate color and density balances. Hence, the image processing conditions and the printing conditions are currently determined based on the film manufacturer and the film type, in addition to the photometric and digital image data.

Under the circumstances, currently used photographic films such as negatives and reversals, particularly those of 135 size, have various kinds of bar codes marked in the edge portion as trade standards; they include a DX bar code that represents film information such as film manufacturer, film type and emulsion number (the DX bar code is hereinafter referred to simply as "DX code"), an expanded DX bar code which, besides including the above film information, adds the information about frame number in order to provide a back print of the frame number of the film for a finished print (the expanded DX bar code is hereinafter referred to simply as "expanded code"), and an FNS code which represents the frame number. These codes can be read automatically by a dedicated bar code reader.

FIG. 10A shows an example of the location DC where the DX code DX or the expanded DX code (DXe) is recorded on a negative film of 135 size, as well as the location FN where the (FNS) code FNS is recorded on the same film. FIGS. 10B, 10C and 10D show an example of the (DX) code DX, the expanded DX code (DXe) and the FNS code (FNS).

As shown in FIG. 10A, if the negative film of 135 size F0 is placed with the emulsion coated side facing down and with the frame number increasing from left to right, the expanded DX code DX or the expanded DX code DXe is recorded on the bottom edge. Namely, the DX or DXe codes are recorded in the edge region DC under bottom perforations P, in two locations in an image region GA of a common full-size frame. On the other hand, FNS is recorded in the edge region FN above top perforations P, in two locations in the image region GA. Hence, these standardized codes are recorded one by one in an image region of a half-size frame. Since the expanded DX code contains a portion representing the frame number, the code FNS is not recorded when the expanded DX code is recorded.

The DX code DX and expanded DX code DXe, as shown in FIGS. 10B and 10C, respectively, share the common feature of being a dual-track bar code consisting of two tracks, a clock track Tc in top and a data track Td at bottom. The DX code DX and expanded DX code DXe are bar codes consisting of 23 and 31 bits, respectively. Each bar code comprises, from left to right, a 6-bit entry pattern S1 representing the beginning of a bar code sequence, a 7-bit film-product-class identification array S2 representing film manufacturer, film type and the like, a 1-bit unassigned bit S3, a 4-bit film-specifier-array representing film's emulsion number and the like, a 1-bit parity bit S5 and a 4-bit exit pattern S6 representing the end of the bar code sequence. The expanded DX code DXe additionally includes 8 bits consisting of a 7-bit frame number array S7 and a 1-bit second unassigned bit S8 and which are interposed between the film-specifier-array S4 and the parity bit S5 in the DX code DX.

The FNS (film number system) code FNS, as shown in FIG. 10D, comprises, from left to right, an entry pattern S9 consisting of one wide bar followed by one narrow space, a frame number sequence S10 consisting of five bars elements interleaved with four space elements, three of these nine elements being wide and the remaining six being narrow, and an exit pattern S11 consisting of one narrow space followed by one narrow bar.

The standardized codes such as the above-described DX code DX, expanded DX code DXe and FNS code FNS provide film information such as film manufacturer, film type and emulsion number and by setting the conditions for printing and image processing the photographic paper in accordance with the film, one can produce finished prints that have been subjected to appropriate processing.

In fact, however, the quality of the image recorded on a photographic film largely varies with the model of the camera used to take the picture, the type of the taking lens, the characteristics of the photographic film on which the image was recorded and other factors. Consider, for example, the image recorded with a comparatively low-price camera such as a film with lens or a compact camera.

Generally speaking, the image, as compared with that recorded with a quality camera such as a single-lens reflex camera, suffers comparatively high levels of overall image blurring, decrease in the amount of exposure in the edge of image field, decrease of contrast, distortion of images such as the subject of interest, and cross color.

The deterioration in the quality of the image reproduced on prints is particularly pronounced when the image taken with a low-price camera is outputted as a print and factors that contribute to this phenomenon include the lateral chromatic aberration and distortion that are caused by the poor performance of the lens fitted on the camera used to record the image. A color image is formed of three primary colors, red (R), green (G) and blue (B) and due to the slight wavelength-dependent differences in the refractive index (imaging magnification) of the lens, the imaging magnification of the three light components, R, G and B, varies to cause "lateral chromatic aberration". As a result, the image recorded on a film will have color mismatch upon reproduction. In order to record a satisfactory image, a plane normal to the optical axis must be correspondingly imaged on an imaging plane. In fact, however, ordinary lenses suffer an aberration called "distortion". The image recorded on a film will accordingly be distorted upon reproduction.

If the image itself that is recorded on a photographic film has deteriorations in quality such as blurring and distortion, the problem cannot be dealt with by such measures as the correction of the amount of exposure and the print quality cannot be improved beyond a certain limit. This problem has become particularly noticeable in recent years as manufacturers offer cameras of lower price as exemplified by films with lens and compact cameras and as users prefer photographic films of higher speed; the deterioration in the quality of images on photographic films that is attributable to the model of the camera used to take pictures, the type of the taking lens, the characteristics of the photographic film and other factors is a direct cause of the substantial decrease in the quality of photographic prints and the like that are prepared by photoprinters.

Under the circumstances, the Assignee filed Japanese Patent Application No. 92804/1996 to propose a photographic processing apparatus and method that enable consistent production of high-quality images in a manner independent of the model of the camera used to take pictures, the type of the taking lens, the characteristics of the photographic film and other factors. However, the method specifically disclosed in the application for acquiring the information about camera model, lens type and film characteristics is by the operator's entering the information via a keyboard or the like or by reading magnetically recorded information and not by reading the information that has been recorded optically on the film. The specification of Japanese Patent Application No. 92804/1996 includes statements to the effect that the photographic film may be provided with an optical record such as bar codes and that the information optically recorded on the photographic film is read. However, there is no disclosure at all as to what information is recorded in what manner using what kinds of bar codes or the like and in what locations on the photographic film, nor is there any indication as to how the recorded bar codes or the like can be read and what kind of information is acquired.

When preparing prints, irrespective of whether they are simultaneous prints (i.e., print images prepared simultaneously with the development of a film) or re-prints (i.e., print images prepared to meet the request of a second order of the user), the most appropriate print is finished in accordance with not only the film information including film manufacturer, film type and emulsion number but also other features such as camera model, lens type and film characteristics. A frequent problem with this practice is that the re-print cannot be finished to the same quality as the simultaneous print. This is because the printing and image processing conditions employed in the making of the simultaneous print are not usually saved and, if they are saved, it is difficult, often impossible, to identify the saved conditions from the frames of a film for which the second order for re-printing has been placed. As a result, the printing and image processing conditions employed in the making of a re-print become different from those used in the making of the simultaneous print.

SUMMARY OF THE INVENTION

The present invention has been accomplished under these circumstances and has as its first object providing a photographic film with recorded information that has a novel bar code from which additional information other than the photographic film type, manufacturer's name and frame number that are contained in standardized codes such as the conventional DX bar code and expanded DX bar code, said additional information being exemplified by the model of a film with lens, the date of film manufacture, film-characteristic identification number and print type useful in determining the image printing and processing conditions and the like can be acquired in a simple manner.

The second object of the present invention is to provide a method of acquiring the information recorded in a photographic film by which the novel bar code recorded on the stated photographic film with recorded information can be easily read to enable easy acquisition of the additional information.

The third object of the present invention is to provide an image processing method that uses the additional information acquired by the stated information acquiring method and which enables easy and positive execution of specified image processing steps that are set on the basis of said additional information.

The fourth object of the present invention is to provide a print system that uses the stated photographic film with recorded information, executes the stated image processing method and uses the obtained image data for the specified image processing to output a finished print that has been given the appropriate specified processing.

The first object of the present invention can be attained by its first aspect which provides a photographic film with recorded information having an optical or magnetic record of a standardized bar code in which information containing at least the type of a photographic film and the manufacturer's name is encoded in accordance with a preset standard, wherein additional information is recorded in a different location than said standardized bar code using a system of a novel bar code that applies the system of said standardized code.

Preferably, said additional information is at least one piece of information selected from the group consisting of a film-characteristic identification number, the date of film manufacture, print type and optionally the model of a film with lens, if it is used at all, as well as the lens type and lens characteristics data.

Preferably, the system of said standardized bar code is that of a DX code or an expanded DX code which comprises two tracks, a data track and a clock track, and have an entry pattern indicating the beginning of a bar code sequence and an exit pattern indicating the end of the bar code sequence, each of said patterns consisting of said two tracks.

Preferably, the system of said novel bar code is such that the relative vertical positions of said data track and said clock track in said DX code or said expanded DX code are reversed but said entry pattern and said exit pattern are used as such, the former indicating the beginning of the bar code sequence and the latter indicating the end of the bar code sequence.

Preferably, the different location than said standardized bar code is at least one recording site of each frame or a photographic film cut to a piece.

Preferably, said print type designates monotone as a condition for producing a finished print. Monotones include sepia and black-and-white.

The second object of the present invention can be attained by its second aspect which provides a method of acquiring the information recorded on a photographic film, wherein said standardized bar code and said novel code that have been recorded as a latent image on the photographic film with recorded information according to said first aspect of the invention and that have been rendered visible by development of the film are optically read with a bar code reader or an image reading sensor having bar code reader heads or image reading devices that are provided in the corresponding positions, thereby acquiring the information recorded in said standardized bar code and the additional information recorded in said novel bar code.

Preferably, said standardized bar code and said novel code that have been rendered visible in said photographic film with recorded information are optically read with the same image reading sensor either simultaneously with or at a different time than the image carried on the film.

The third object of the present invention can be attained by its third aspect which provides an image processing method which, at the time of printing, acquires said additional information by the method of acquiring the information recorded on a photographic film according to said second aspect of the invention, uses said acquired additional information and performs specified image processing steps that are set in accordance with the thus acquired additional information.

According to the first embodiment of the third aspect of the present invention, there is provided an image processing method which when the photographic film with recorded information according to said first aspect of the invention is a film with lens that has the information about its model or lens type or its lens characteristics data recorded as said additional information, acquires, at the time of printing, the information about the model or lens type of said film with lens or its lens characteristics data as said additional information by the method of acquiring the information recorded on a photographic film according to the second aspect of the invention and corrects at least one defect selected from among lateral chromatic aberration, distortion, decrease in the brightness of the edge of image field and blurring using the information about image's pixel position and the characteristics of a taking lens in accordance with the acquired information about the model or lens type of the film with lens or its lens characteristics data.

According to the second embodiment of the third aspect of the present invention, there is provided an image processing method which, when the additional information recorded on the photographic film with recorded information according to the first aspect of the invention contains a film-characteristic identification number, acquires, at the time of making a simultaneous print, said film-characteristic identification number as said additional information by the method of acquiring the information recorded on a photographic film according to the second aspect of the invention and, in accordance with the acquired identification number, stores in a database for a photoprinter either image data or the image processing or printing conditions employed at the time of making the simultaneous print, and acquires, at the time of making a re-print, said film-characteristic identification number recorded on said photographic film with recorded information, downloads from said database said image data or said image processing or printing conditions that correspond to the acquired identification number, and prepares a finished print on the basis of said downloaded image data or in accordance with said downloaded image processing or printing conditions.

According to the third embodiment of the third aspect of the present invention, there is provided an image processing method which, when said additional information recorded on the photographic film with recorded information according to the first aspect of the invention contains a print type, acquires, at the time of printing, said print type as said additional information by the method of acquiring the information recorded on a photographic film according to the second aspect of the invention and creates a finish to the acquired print type.

The fourth object of the present invention can be attained by its fourth aspect which provides a print system comprising:

the photographic film with recorded information according to the first aspect of the invention;

a bar code reader or an image reading sensor having bar code reader heads or image reading devices that are provided in positions that correspond to said standardized bar code or said novel bar code that are recorded on said photographic film, said bar code reader heads or image reading devices reading said bar codes optically to acquire the recorded information associated with the thus read bar codes;

an image processing apparatus with which said additional information acquired with said bar code reader or said image reading sensor is used to perform specified image processing steps that are set in accordance with said additional information; and a photoprinter that exposes the image carried on said photographic film which has been subjected to image processing with said image processing apparatus and develops the exposed image to output a finished print.

BRIEF DESCRIPTION OF DRAWINGS

FIG. 3 is a schematic plan view showing, with part taken away, another example of the photographic film with recorded information;

FIG. 8 shows in conceptual form the aberration correcting part of the image processing apparatus shown in FIG. 7;

FIG. 9 is a flowchart showing an example of the image processing method according to the third aspect of the invention;

DETAILED DESCRIPTION OF THE INVENTION

The four aspects of the present invention, i.e., a photographic film with recorded information, a method of acquiring the information recorded on the photographic film, an image processing method using the acquired information and a print system using the same, are described below in detail with reference to the preferred embodiments shown in FIGS. 1–9.

Figure 1:
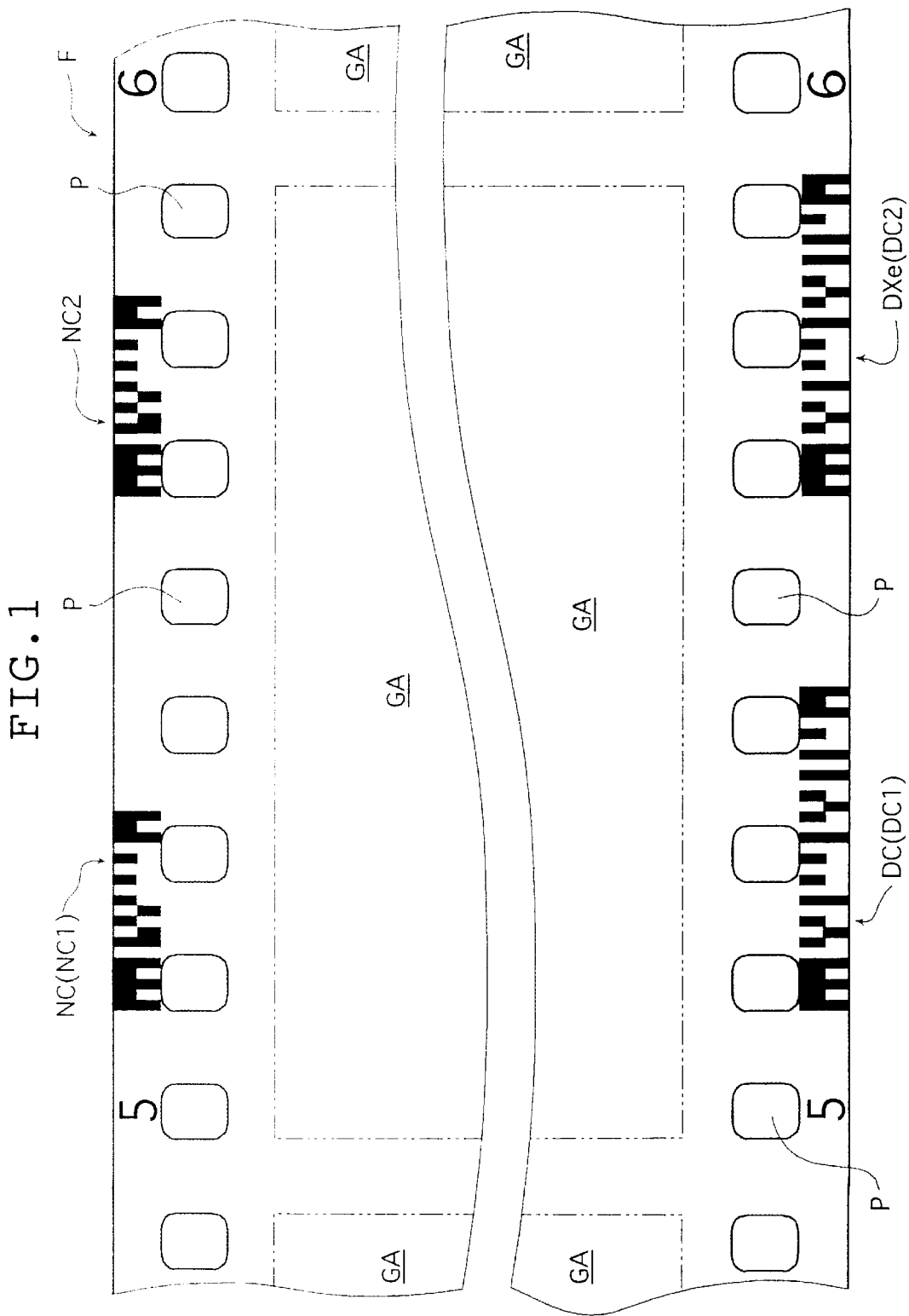
FIG. 1 is a schematic plan view showing, with part taken away, an example of the photographic film with recorded information according to the first aspect of the present invention.

FIG. 1 is a schematic diagram showing an example of a photographic film with recorded information according to the first aspect of the present invention. The illustrated photographic film with recorded information is a color negative film of 135 size that is placed with the emulsion coated side facing down and with the frame number increasing from left to right (from the upstream to the downstream end) of the drawing. It should, however, be noted that this is not the sole case of the present invention.

As shown, the photographic film with recorded information of the present invention (which is hereinafter referred to simply as "film" and generally indicated by F) has the following elements: a sequence of perforations P that are formed at specified intervals on both sides of the length that are exterior to the central image region, specifically a full-size image region GA; an expanded DX bar code (which is hereinafter referred to simply as "expanded code") DXe (DC1, DC2) that is a standardized bar code set as a trade standard (which is hereinafter referred to simply as "standardized code") that is recorded as a latent image at the bottom of the drawing between the outside edges of perforations P and the bottom edge of the film F; and a novel bar code (which is hereinafter referred to simply as "novel code") NC (NC1, NC2) that characterizes the present invention and which is recorded as a latent image on the top between the outside edges of perforations P and the top edge of the film F.

In the illustrated case, each of the expanded code DXe (DC1, DC2) which is the standardized bar code DC and the novel code NC (NC1, NC2) is recorded in two locations in the full-size image region GA so that they are adaptive to images taken in half-size. However, this is not the sole case of the present invention and the standardized code DC or the novel code NC may be recorded in at least one location for each frame or they may be recorded in at least one location on a piece of cut film. In the present invention, the novel code NC is recorded in the film edge region opposite the film edge region in which the expanded code DXe or the DX code DX is recorded, so it goes without saying that the conventional FNS code is not recorded in that opposite film edge region. The latent-image DX code DX and the latent-image expanded code DXe are rendered visible by a wet development process following the taking of a picture of the subject on the film F.

Figure 10A:
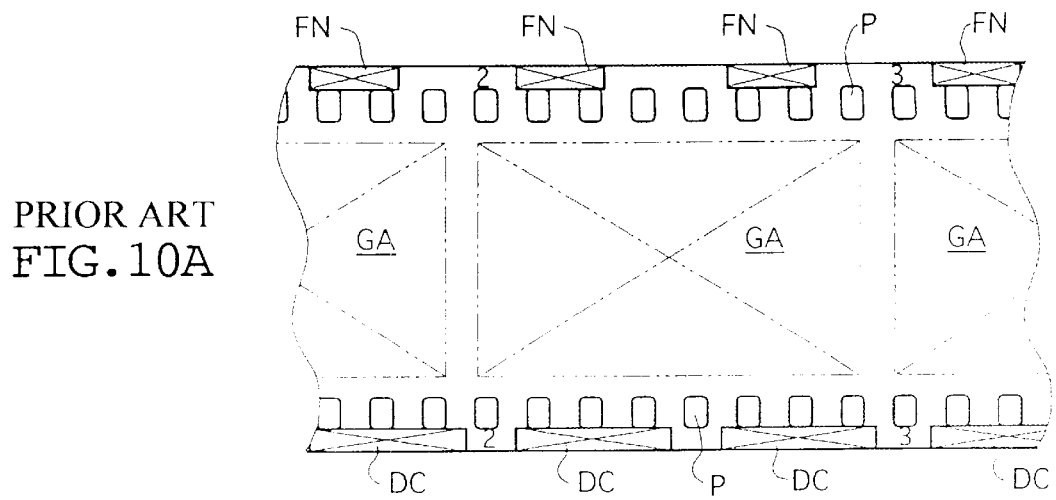
FIG. 10A is a schematic plan view showing, with part taken away, a conventional photographic film.
Figure 10B:
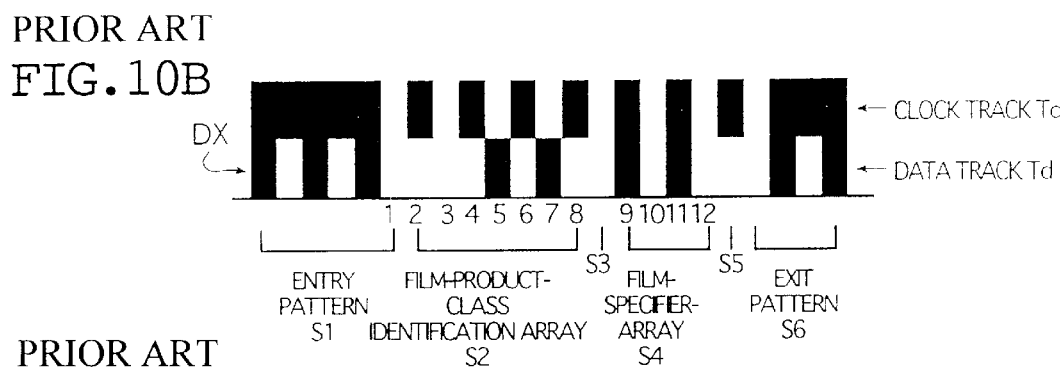
FIGS. 10B, 10C and 10D illustrate three standardized bar codes, DX bar code, expanded DX bar code and FNS bar code, respectively, that are used on the conventional photographic film.
Figure 10C:
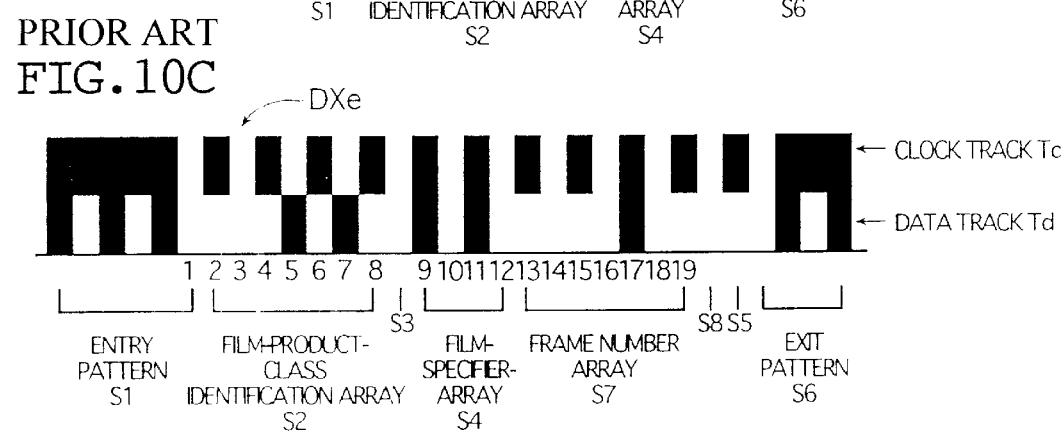
Figure 10D:
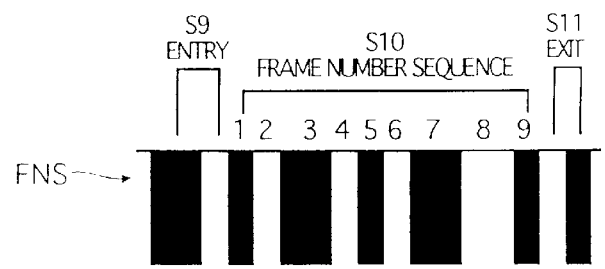

Speaking first the expanded code DXe (DC1, DC2) which is a standardized code, it has a completely identical coding system to the conventional expanded code DXe which is shown in FIG. 10C and, as already mentioned, it is a 31-bit bar code consisting of two tracks, a clock track Tc in top and a lower data track Td at bottom. As shown in FIG. 10C, the expanded code DXe (DC1, DC2) comprises, in order from the upstream end (from left to right), an entry pattern (4-bit) S1 indicating the beginning of the code sequence, a film-product-class identification array (7-bit) S2, an unassigned bit (1-bit) S3, a film-specifier-array (4-bit) S4, a frame number array (7-bit) S7, a second unassigned bit (1-bit) S8, a parity bit (1-bit) S5 and an exit pattern (4-bit) S6 indicating the end of the code sequence. The film-product-class identification array S2 and the film-specifier-array S4 represent film information such as film manufacturer, film type and emulsion number, and the frame number array S7 represents the frame number of a film.

Needless to say, the expanded code DXe (DC1, DC2) is not the only standardized code DC that can be used in the present invention and it may be replaced by the conventional 23-bit DX code DX shown in FIG. 10B which does not contain the frame number array S7 or the second unassigned bit S8. The DX code DX is identical in a roll of film or films of the same type whereas the expanded code DXe is identical in a roll of film or films of the same type except for the frame number array S7.

As in the case of standardized codes DC like DX code DX and expanded code DXe, the novel code NC (NC1, NC2) consists of a clock track Tc and a data track Td, except that the clock track Tc is facing the film edge and the data track Td facing the image region GA. It should, however, be noted that as is clear from FIG. 1, the orientation of the bar code pattern in the two types is identical in the same direction. The novel code NC has a 6-bit entry pattern SA at the upstream end (at the beginning of the code sequence), then an n-bit information bit SB, and a 4-bit exit pattern SC at the downstream end (at the end of the code sequence). The relative positions of the entry pattern SA and the exit pattern SC in the novel code NC are entirely opposite to those in the DX code DX and expanded DX code DXe when seen from the film edge; however, as is clear from FIG. 1, they are completely identical when seen in the same direction.

Figures 2A, 2B:
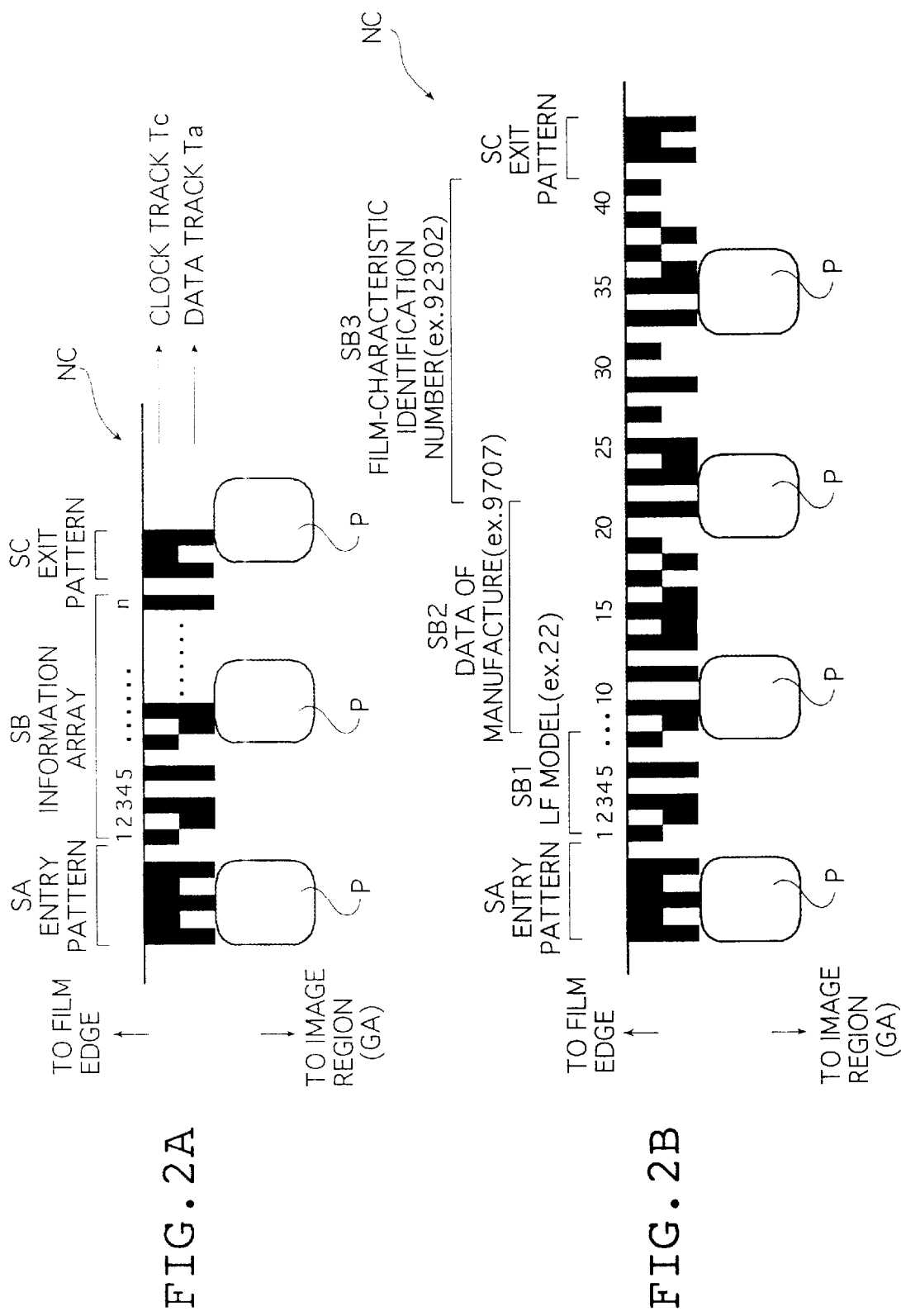
FIG. 2A illustrates the composition of a novel code on the photographic film with recorded information that is shown in FIG. 1.
FIG. 2B illustrates a specific example of the novel code.

The information bit SB is useful in the image processing method according to the third aspect of the present invention and in the print system according to its fourth aspect, both of which will be described later in this specification. As shown in FIGS. 2A and 2B, the information bit SB is provided to represent in a bar code format at least one piece of film information and film-related information that is not contained in the DX code DX or the expanded DX code DXe such as, for example, the model of a film with lens (hereinafter referred to simply as "LF"), the lens type of LF, the lens characteristics data of LF, the date of its manufacture, film-characteristic identification number (hereinafter referred to simply as "film ID") and print type. Specifically, in the case illustrated in FIG. 2A, the information bit SB in the novel code NC is solely composed of an LF model pattern SB1 whereas, in the case illustrated in FIG. 2B, it is composed of a 7-bit LF model pattern SB1 immediately following the entry pattern SA, a 14-bit manufacture date pattern SB2, and a 20-bit film ID pattern SB3 immediately followed by the exit pattern SC. In the case illustrated in FIG. 2B, the LF model pattern SB1 represents 22, indicating that the LF of interest is numbered 22; the manufacture date pattern SB2 represents 9707, indicating that the LF was manufactured in July 1997, the film ID SB3 represents 92302, indicating that the film of interest is numbered 92302.

The novel bar code used in the present invention can add entirely new information to a photographic film by applying the existing trade standard bar code systems used such as the DX bar code and the expanded DX bar code. Since the existing bar code systems can be applied, there is no need to create an entirely novel bar code system in the present invention. In addition, the conventional photoprinters can read existing standardized bar codes DC positively, so both the standardized codes DC and the novel code NC in the photographic film of the present invention can be read positively with the bar code reader in the conventional photoprinter if it is subjected to a simple improvement and there is no need to perform substantial design alterations and improvements on the existing photoprinter.

Consider now the case of optically forming a latent image of the novel bar code on a photographic film. Since the existing bar code systems are adopted in the present invention, there is no need for substantial changes in the exposing pattern and reversing the bar code pattern as seen from the film edge is the only exception. If the information in existing bar codes such as the DX code and the expanded DX code is increased, these existing standardized bar codes become different from the trade standards and the conventional photoprinter manufactured in compliance with the trade standards must accordingly be revamped. However, in the present invention, the conventional standardized bar codes are applied as such, except that they are reversed and provided in different locations and this allows the conventional photoprinter to be useful if it is subjected to simple improvements. What is more, both conventional photographic films and the photographic film of the present invention can be processed by the photoprinter.

It should be noted here that the photographic film with recorded information of the present invention is by no means limited to the photographic film illustrated in FIG. 1 such as a negative or reversal film of 135 size and it goes without saying that the film may be a photographic film of the Advanced Photo System such as a negative film of 240 size which is shown in FIG. 3 or it may be any other photographic films.

The negative film Fa of 240 size which is shown in FIG. 3 is in engagement with the spool Fs of a cartridge Fc at one end and wound up in layers to be contained in the cartridge Fc. The film Fa has the image region GA of each frame in the central area of the length. Exterior to GA and on the edge of one side of the film width, a perforation P is provided for each frame at both ends of the image region GA in the longitudinal direction of the film. The novel code NC which characterizes the present invention is formed between two perforations P on the edge of one side of the film Fa exterior to the image region GA, and a magnetic track MT is formed in the corresponding area of the reverse side of the film. A conventional standardized code is formed on the opposite edge of the film Fa exterior to the image region GA, and another magnetic track MT is formed in the corresponding area of the reverse side of the film.

The magnetic tracks MT have various kinds of information recorded thereon, exemplified by the film ID, the information obtained when taking the image recorded in the image region GA of each frame, the size and volume (in sheets) of the prints to be produced. The magnetic track MT on the side remote from the perforations P is primarily intended as a camera track to record the information obtained when taking the image with an imaging device such as a camera, whereas the magnetic track MT on the perforation P side is primarily used as a laboratory track to record the information necessary for development, printing and other operations.

The 240 film Fa of the Advanced Photo System has the following additional elements: around perforations Pa provided on both sides of the film length in such way as to mark off the regions where the image is recorded: (1) a film-characteristic identification number FID on both sides of the film length (as shown at the bottom); (2) a standardized bar code DCN representing the optical information of the film and so forth on both sides of the film length (as shown on the top); (3) a notch NT at the leading end of the film; and a detach perforation (not shown) at the trailing end of the film. These elements help identify the image forming regions of the film Fa, as well as its leading and trailing ends.

Thus, as in the case of the 135 film shown in FIG. 1, the 240 film Fa of the Advanced Photo System shown in FIG. 3 has the novel code NC characteristic of the present invention and it can be optically read in the same manner as described above.

The basic composition of the photographic film with recorded information according to the first aspect of the invention is described above.

We next describe the method of acquiring the information recorded on the photographic film according to the second aspect of the present invention, the image processing method according to its third aspect, and the print system according to its fourth aspect.

Figure 4:
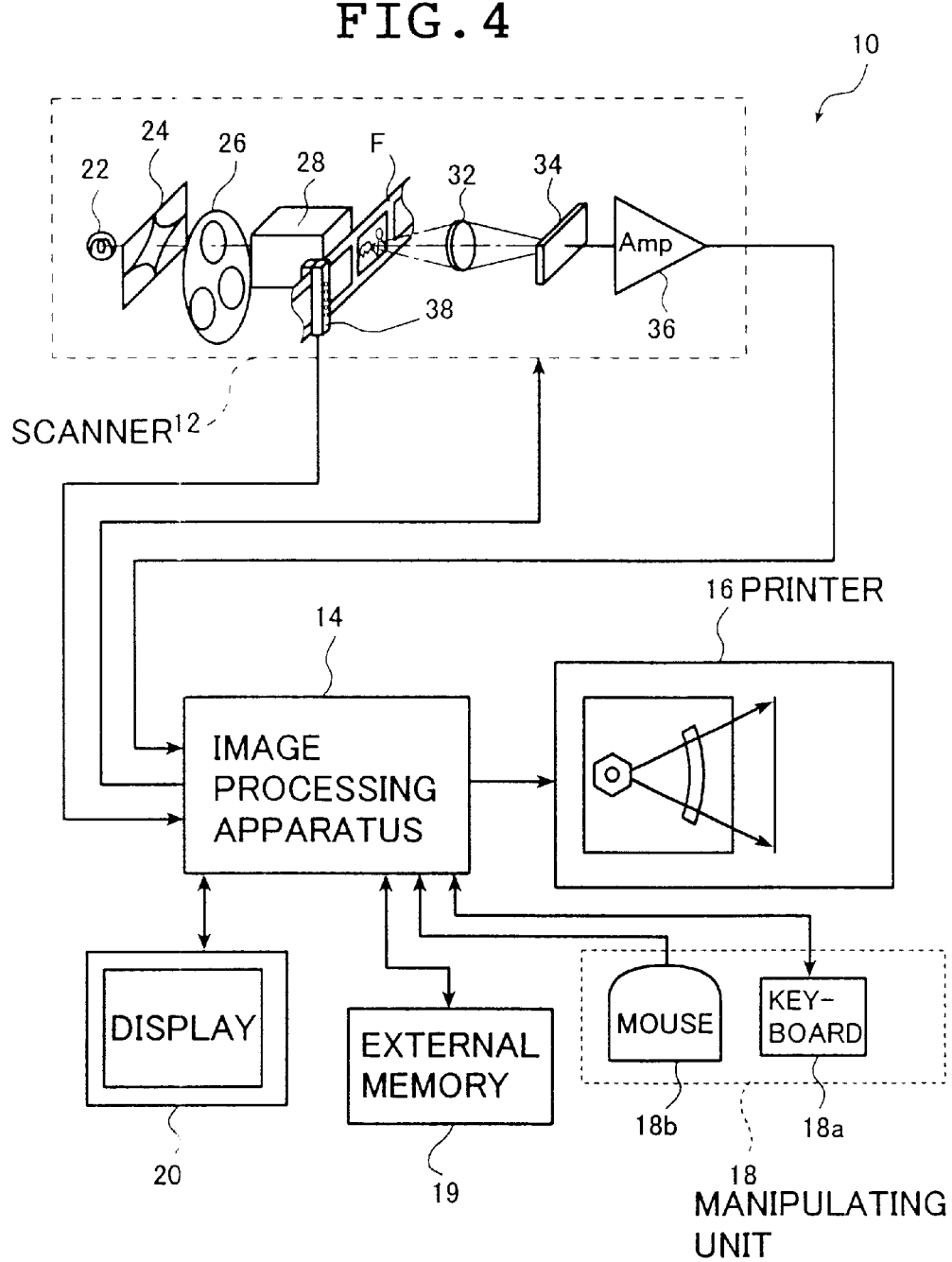
FIG. 4 is a block diagram showing an example of a digital photoprinter in a print system that implements the method of acquiring the information recorded on a photographic film and the image processing method according to the second and third aspects, respectively, of the present invention.

FIG. 4 is a schematic diagram showing an example of a print system of the present invention for which implements the method of acquiring the information recorded on the photographic film, as well as the image processing method of the invention.

The print system shown in FIG. 4 has a photographic film F with recorded information according to the first aspect of the present invention and a digital photoprinter 10 (which is hereinafter referred to simply as "photoprinter 10"). The digital photoprinter 10 comprises basically a scanner (image reading apparatus) 12 for photoelectric reading of the image recorded on a film F, an image processing apparatus 14 which performs image processing on the thus read image data (image information) and with which the photoprinter 10 as a whole is manipulated and controlled, and a printer 16 which performs imagewise exposure of a light-sensitive material (photographic paper) with light beams modulated in accordance with the image data delivered from the image processing apparatus 14 and which performs development and other necessary processing to produce a (finished) print.

Connected to the image processing apparatus 14 are a manipulating unit 18 having a keyboard 18a and a mouse 18b for inputting (setting) various conditions, selecting and commanding a specific processing step and entering a command and so forth for effecting color/density correction, as well an external memory 19 for storing the data and processing program necessary for implementing the image processing method according to the third aspect of the present invention, for example, the additional optical information represented by the novel code NC and the associated image processing and printing conditions (e.g. LF model, LF lens type, lens characteristics data, film ID, print type and image processing conditions for simultaneous printing) and for optionally storing the image data obtained, as well as a display 20 for displaying the image read with the scanner 12, various manipulative commands and pictures for setting and registering various conditions.

The scanner 12 is an apparatus with which the image recorded on the film F is read photoelectrically frame by frame. It comprises a light source 22, a variable diaphragm 24, a color filter assembly 26 that has three color filters R, G and B for separating the image into three primary colors R (red), G (green) and B (blue) and which rotates to have any one of these color filters act on the optical path, a diffuser box 28 which diffuses the reading light incident on the film F so that it becomes uniform across the plane of the film F, an imaging lens unit 32, a CCD sensor 34 (which is an area sensor in the illustrated case) for reading the image in one frame of the film, an amplifier (Amp) 36, and a bar code reader 38 for optically reading the standardized code DC and the novel code NC recorded on opposite edges of the film F of the present invention.

In the illustrated photoprinter 10, dedicated carriers are available that can be loaded into the housing of the scanner 12 in accordance with the type of the film used (e.g. whether it is a negative film of 240 size or a negative or a reversal of 135 size), the format of the film (e.g. whether it is a strip or a slide) or the mode of the processing to be performed (e.g. whether it is trimming). By replacing one carrier with another, the photoprinter 10 can be adapted to process various kinds of films in various modes. The image (frame) that is recorded on the film and which is subjected to the necessary procedure for print production is transported to and held in a specified reading position by means of the carriers. The bar code reader 38 is provided on the carrier upstream of the specified reading position in the direction of transport and as the film F is being transported to the specified reading position, the standardized code DC and the novel code NC are read optically by this bar code reader.

As already mentioned, the film Fa of 240 size according to the Advanced Photo System which is shown in FIG. 3 has the magnetic track MT formed and information such as the cartridge ID and the film type are recorded. In addition, when taking a picture or during development and so forth, various kinds of data such as the date of shooting, the camera used in shooting and the type of the developing machine used can be recorded on the film. A carrier corresponding to the film Fa (or its cartridge Fc) of the Advanced Photo System is fitted with a recording device 40 (see FIG. 5) for reading or recording reading said magnetic information from the magnetic recording medium. The recording device 40 reads and/or records the magnetic information as the film is being transported to the reading position, so that the various kinds of information mentioned above are sent to and from the image processing apparatus 14.

Figure 5A:
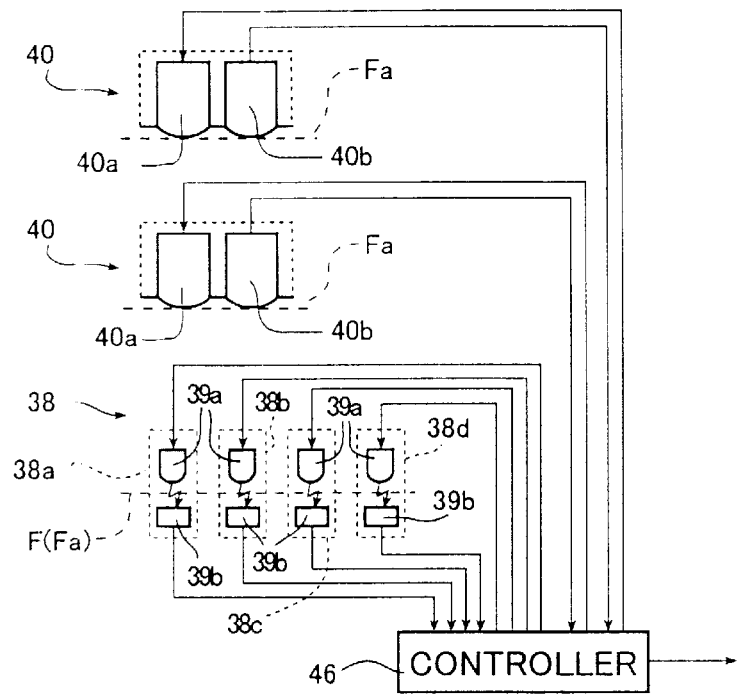
FIG. 5A illustrates an example of the bar code reader and magnetic heads used in the scanner of the digital photoprinter shown in FIG. 4.
Figure 5B:
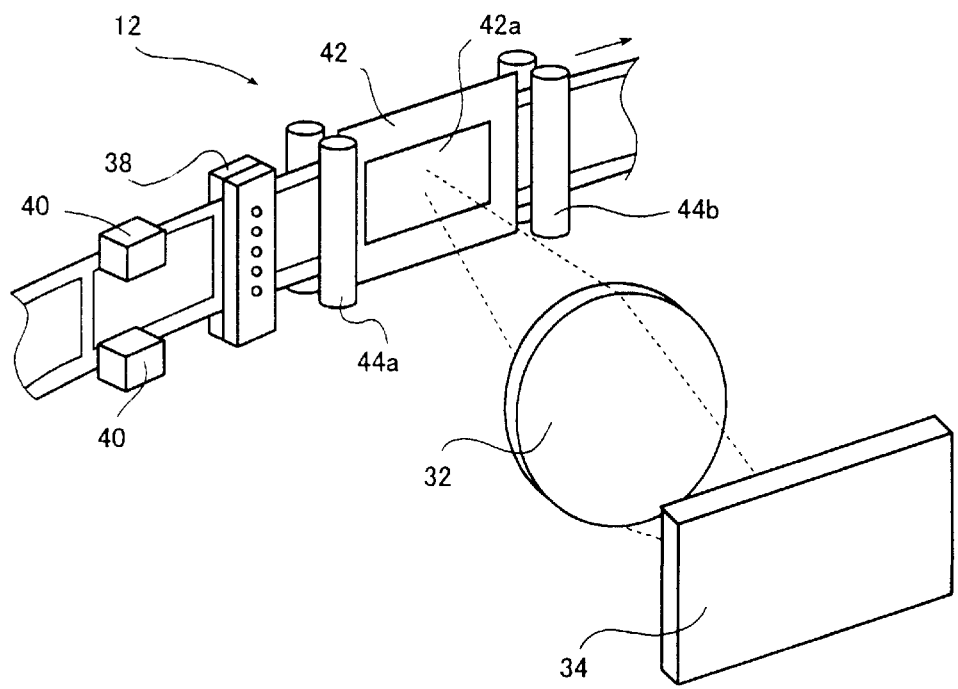
FIG. 5B is a diagrammatic perspective view showing an example of the essential part of the scanner.

FIGS. 5A and 5B show an example of the bar code reader 38 that implements the method of the present invention for acquiring the information recorded on a photographic film, as well as the recording device 40 of reading the information from the 240 film shown in FIG. 3, or recording information in said film (the recording device is hereinafter referred to as "magnetic head").

The film F or Fa is transported intermittently by transport rollers 44a and 44b provided upstream and downstream, respectively, of a carrier mask 42 having a sufficient opening 42a to determine the reading position and size of the film F or Fa. The bar code reader 38 has four optical sensors 38a, 38b, 38c and 38d that each serve as a bar code reader head and which are provided upstream of and near the transport roller 44a along the transport width of the film F or Fa. Each of the optical sensors 38a–d has a light-emitting element 39a in the top and a light-receiving element 39b at the bottom in such a way that the film F or Fa (indicated by a dashed line) is held between the two elements as it is transported through a film transport path.

The optical sensors 38a and 38d provided in a face-to-face relationship with opposite ends of the width of the film F, Fa are for reading the optical information as in the novel code NC which characterizes the present invention and the standardized code DC. Besides such optical information, the optical sensors 38a and 38d are capable of detecting the perforations P in the film F, Fa and their leading and trailing ends. The optical sensors 38b and 38c are provided in a face-to-face relationship with the middle of the width of the film F, Fa are used to detect the image regions GA of the picture recorded in the film F, Fa and the non-image region between adjacent image regions, namely, frames, typically in the case of automatic transport of the film F, Fa and reading a plurality of successively transported frames using a line sensor to be described later in this specification.

In the present invention, the bar code system for the conventional standardized codes DC is applied to record the novel code NC, so the optical sensors 38a–d serving as bar code reader heads, may be the same as the optical sensors 38a–d for reading the conventional standardized codes and the novel code NC can similarly be read as bar codes.

The magnetic heads 40 are provided on the carrier associated with the 240 film Fa shown in FIG. 3 and they are in a face-to-face relationship with the magnetic tracks MT at opposite ends of the film Fa further upstream of the bar code reader 38. Each magnetic head 40 comprises a recording head 40a for recording magnetic information on the magnetic track MT, and another recording head 40b for reading the magnetic information recorded on the magnetic track MT.

The bar code reader 38 and the magnetic heads 40 which are constructed in the manner just described above are connected to a controller 46 provided on the scanner 12. The controller 46 is also connected to a motor for driving the carrier transport rollers 44a and 44b and so forth, various sensors and a solenoid for opening and closing the mask (film retainer) 42. These elements are not shown. As the film F, (Fa) is transported (or frames are fed by means of the transport rollers 44a and 44b under the control of the controller 46), the bar code reader 38 reads the optical information as in the standardized code DC and the novel code NC on the film F, (Fa) whereas the recording head 40a of each magnetic head 40 records magnetic information on tracks MT that is supplied from the controller 45, upon receiving the information from the image processing apparatus 14. The reading head 40b of the magnetic head 40 also reads the magnetic information recorded on the film Fa.

The thus read optical and magnetic information are sent to the image processing apparatus via the controller 46. The standardized code DC and the novel code NC that have been read with the bar code reader 38 are converted to numerals or otherwise encoded in the controller 46 and sent to the image processing apparatus 14, where standardized code DC is acquired as conventional optical information such as film type, manufacturer's name and frame number and the novel code NC as additional optical information such as the model of film with lens (LF), LF lens type, LF lens characteristics data, the date of manufacture, film ID and print type.

The reading of the optical information by the bar code reader 38 and the acquisition of the magnetic information by the magnetic heads 40 are preferably performed during film transport or frame feed in a prescan mode for rough reading of the image on the film F, (Fa). This, however, is not the sole case of the present invention and the reading of the optical information and the acquisition of the magnetic information may be performed in a fine scan mode. Alternatively, entirely separate dedicated devices may be used.

In the illustrated case, the standardized code DC and the novel code NC that are recorded on opposite edges of the film F are optically read with the bar code reader 38 having bar code reader heads (38a, 38d) provided in positions corresponding to these bar codes so as to acquire the recorded information associated with the thus read bar codes. This is not the sole case of the present invention and those bar codes may be read with an image reading sensor comprising one or more image reading devices provided in a position or positions corresponding to those bar codes, as exemplified by a CCD sensor comprising one or more CCD devices, so as to acquire the recorded information associated with the thus read bar codes. In the following description of the image reading sensor, a CCD sensor is taken as a typical example; it should, however, be noted that the image reading sensor that can be used in the present invention is by no means limited to a CCD sensor.

If a CCD sensor is to be used, it may be entirely separate from an image reading CCD sensor which is to be discussed later in this specification (and indicated by 34 or 48). Preferably, the CCD sensor 34 or 48 is designed as an area or line CCD sensor in which CCD elements are arranged not only in areas that correspond to the image regions GA of the film F but also in areas that correspond to the standardized code DC and the novel code NC on opposite edges of the film F so that these bar codes can be read photoelectrically in synchronism or simultaneously with the photoelectric reading of the image. In this preferred case, the bar code portions are clipped from the density data read with the CCD sensor so that the information in the bar codes is acquired in the scanner 12 or the image processing apparatus 14. If the bar code reader is used, the bar codes and the image in one frame of the film F are not read simultaneously but the bar codes in one frame and the image in a different frame are read simultaneously. In contrast, the use of a CCD sensor has the advantage that the bar codes and the image in one frame of the film F can be read simultaneously. In the present invention, even if the same image reading sensor such as CCD sensor is used for the photoelectric reading of both the image and the bar codes, the timing of reading is not limited to being simultaneous and it should of course be understood that they may be read at different timings. Referring, for example, to the case of using a line sensor, the bar codes may be read on the forward path and the image on the return path, or vice versa.

Described above is the basic composition of the method of acquiring the information recorded on a photographic film according to the second aspect of the present invention.

In the scanner 12 described above, the image in one frame of the film F, Fa is read after the reading of the optical and magnetic information on the film F, Fa by means of the bar code reader 38 and the magnetic heads 40, respectively. In the scanner 12, the reading light from the light source 22 has its quantity adjusted by means of the variable diaphragm 24, adjusted in color by passage through the color filter assembly 26 and diffused in the diffuser box 28. The diffused reading light is incident on one frame of the film F or Fa (hereinunder typified by 135 film F) held in the specified reading position by means of the carrier and thereafter passes through the frame to produce projected light bearing the recorded image in the particular frame of the film F.

The projected light from the film F is processed by the imaging lens unit 32 to be focused on the light-receiving plane of the CCD sensor 34, which reads the focused light photoelectrically; the resulting output signal is amplified with the Amp 36 and sent to the image processing apparatus 14. The CCD sensor 34 is typically an area CCD sensor consisting of 1380×920 pixels.

The scanner 12 performs this image reading step three times by successively inserting the color filters R, G and B of the color filter assembly 26, whereupon the image of one frame is read as three separate primary colors R, G and B.

The illustrated photoprinter 10 is such that prior to image reading (fine scanning) for outputting a print P, prescanning which reads the image at low resolution is performed in order to determine the image processing conditions and so forth. This means that a total of six image reading steps are performed for one frame.

Figure 6A:
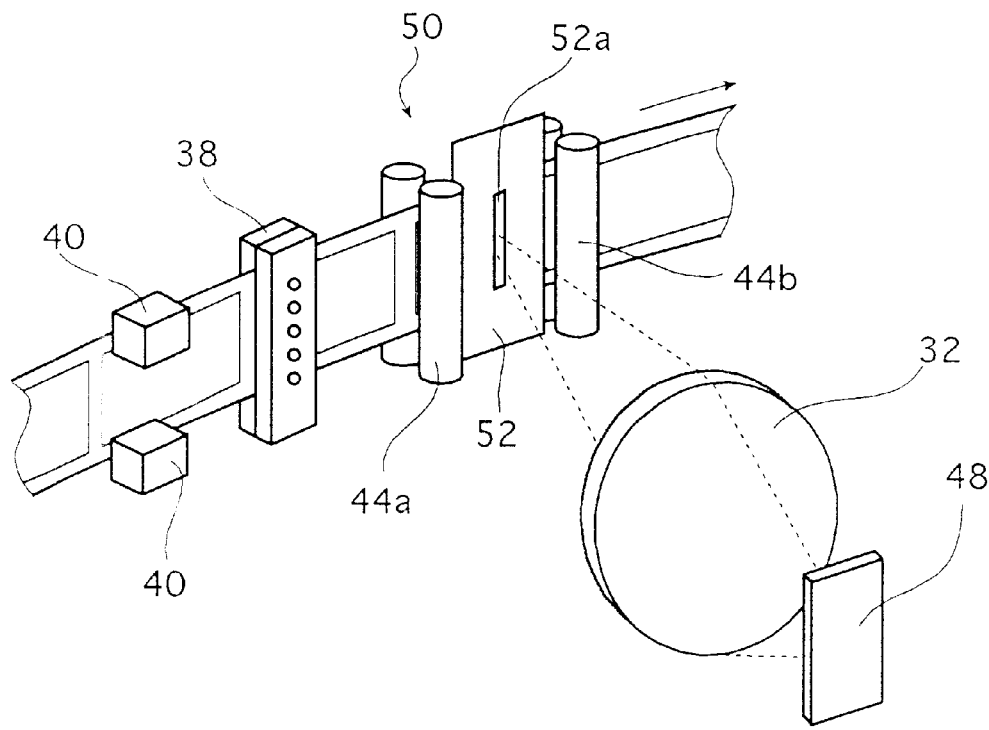
FIG. 6A is a diagrammatic perspective view showing another example of the essential part of the scanner.
Figure 6B:
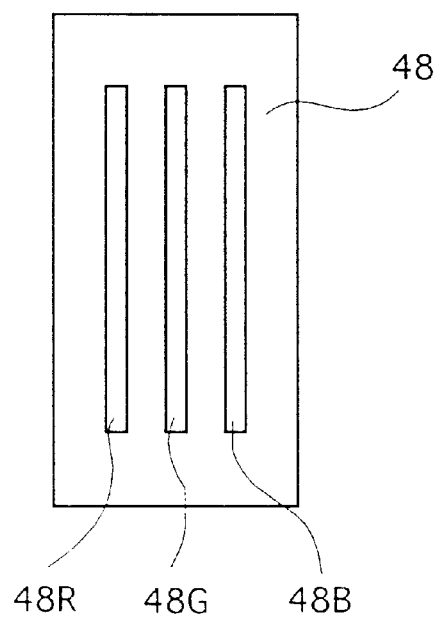
FIG. 6B is a diagrammatic plan view showing an example of the line sensor used in the scanner.

For image reading, the scanner 12 uses an area CCD sensor and separates the projected light into three primary colors by means of the color filter assembly 26. This is not the sole case of the scanner that can be used in the present invention; the area sensor may be replaced by a scanner 50 which, as shown in FIG. 6A, uses three line CCD sensors associated with the reading of the light of three primary colors (i.e., 48R, 48G and 48B that make up a line sensor 48 as shown in FIG. 6B) may be used such that the image is read by slit scan of the film F as it is transported with the carrier transport rollers 44a and 44b. The scanner 50 is capable of reading three colors R, G and B simultaneously, so both prescan and fine scan need be performed only once. Whether the film to be processed is a piece of cut film F, a strip of film F or a roll of 240 film Fa in a cartridge, reading may be performed on the forward and return paths and this simplifies the image reading operation. In a prescan mode, all frames can be read in succession.

The scanner 50 shown in FIG. 6A has a similar construction to the scanner 12 shown in FIGS. 4 and 5B. The two scanners have no essential differences except for the following three points: the film retaining mask 42 in the scanner 12 is replaced by a slit plate 52 having a vertically elongated narrow slit 52a (which may be made up of the top cover of the carrier); the area sensor 34 is replaced by the line sensor 48; and the color separating filter assembly 26 is replaced by a light adjusting filter assembly (not shown) that controls the quantity of the light from the light source 22 for each color component. Due to this close similarity to the scanner 12, the scanner 50 will not be described in detail.

The line sensor 48 is a 3-line reading sensor with which the projected light passing through the film F is separated into the three primary colors R, G and B for simultaneous reading and, as shown in FIG. 6B, composed of three line CCD sensors 48R, 48G and 48B for reading the R, G and B lights, respectively. Each of the line CCD sensors 48R, 48G and 48B uses a CCD array having the specified same number of CCD devices arranged in a row such that they are adapted to read the corresponding specified number of pixels. A R filter, a G filter and a B filter are respectively provided on the resulting three CCD arrays.

In the illustrated photoprinter 10, the scanner 12 which performs photoelectric reading of the image recorded on a film such as a negative or a reversal is used as a source of supplying image data into the image processing apparatus 14. It should, however, be noted that the scanner 12 is not the only applicable source of supplying image data into the image processing apparatus 14 and various image reading means, imaging means and means of storing image data can be substituted, as exemplified by an image reading apparatus for reading the image on a reflection original, an imaging device such as a digital camera or a digital video camera, communication means such as a LAN (local area network) or an on-line service network, and a recording medium such as a memory card or MO (magneto-optical recording medium).

As already mentioned, the output signal (image data) from the scanner 12 is delivered to the image processing apparatus 14.

Figure 7:
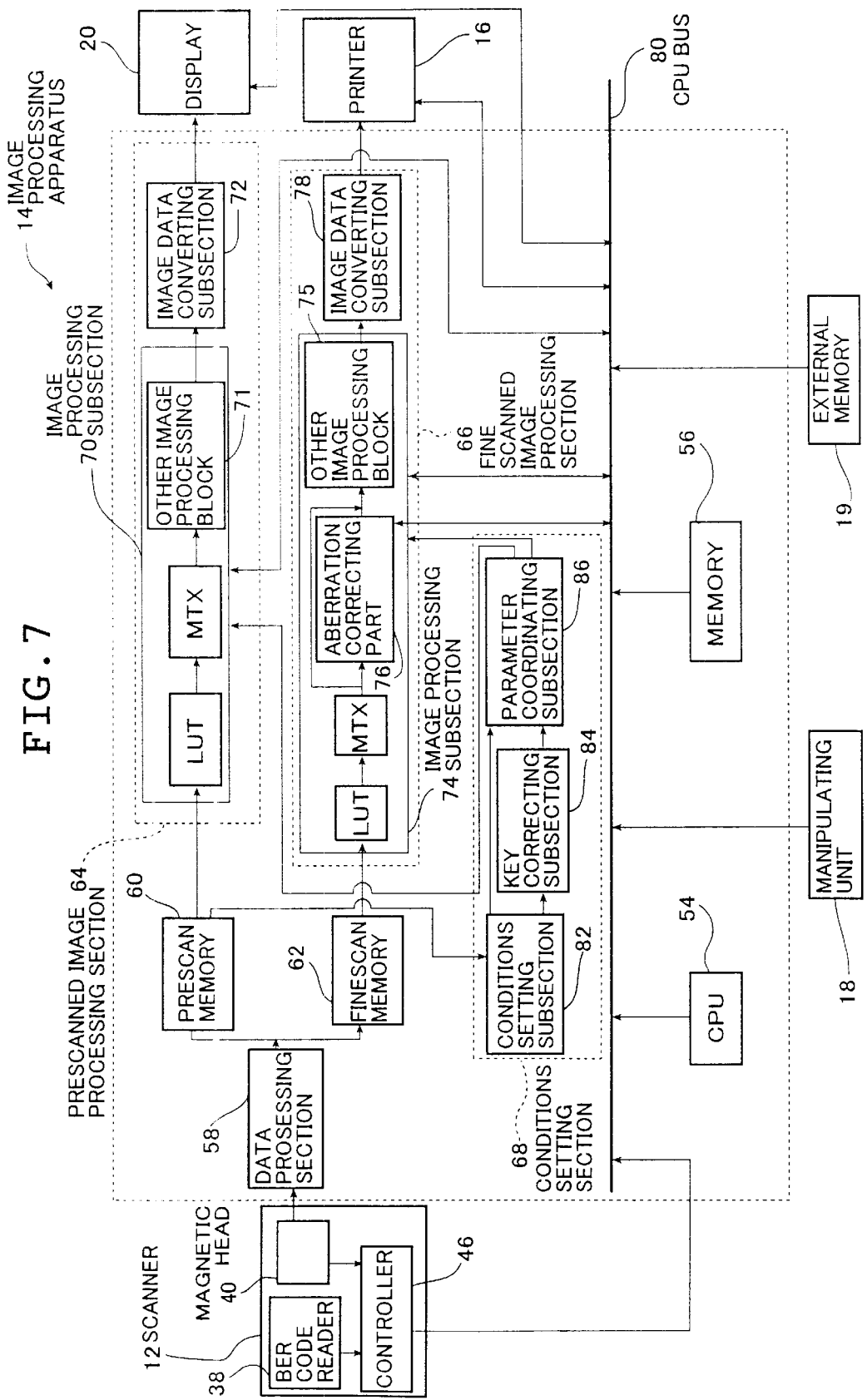
FIG. 7 is a block diagram showing an example of the image processing apparatus in the digital photoprinter shown in FIG. 4.

FIG. 7 is a block diagram of the image processing apparatus 14 (which is hereinafter sometimes referred to as "processor 14"). The processor 14 is roughly composed of two lines, a control line and an image processing line. The control line comprises a CPU 54 for implementing and controlling the image processing method of the invention and with which the photoprinter 10, whole or in part, including the scanner 12, processor 14, printer 16, external memory 19 and display 20 is controlled and managed, as well as an internal memory 56 for storing the necessary information for implementing the image processing method of the present invention and for the operation and otherwise of the photoprinter 10. The image processing line comprises a data processing section 58, a prescan (frame) memory 60, a fine scan (frame) memory 62, a prescanned image processing section 64, a fine scanned image processing section 66, and a conditions setting section 68.

Besides these components, the processor 14 includes a means of determining the value to which the variable diaphragm 24 is stopped down in a fine scan mode and the storage time of the CCD sensor 34. In the control line, the manipulating unit 18, the external memory 19 and the display 20 are connected to related parts via a CPU bus 80 under the control of the CPU 54 and other parts.

In the image processing line, each of the output signals R, G and B from the scanner 12 is fed into the data processing section 58, where it is subjected to A/D (analog/digital) conversion, logarithmic conversion, DC offset correction, dark correction, shading correction and other processing steps so that each output signal is converted to digital image data, of which prescanned (image) data is stored in the prescan memory 60 and fine scanned (image) data is stored in the fine scan memory 62.

It should be noted that the prescanned data and the fine scanned data are basically the same except for resolution (pixel density) and signal level.

The prescanned data stored in the prescan memory 60 is subsequently processed in the prescanned image processing section 64 and the fine scanned data stored in the fine scan memory 62 is subsequently processed in the fine scanned image processing section 66.

The prescanned image processing section 64 comprises an image processing unit 70 and an image data converting subsection 72. The fine scanned image processing section 66 comprises an image processing unit 74 and an image data converting subsection 78.

The image processing unit 70 of the prescanned image processing section 64 (which is hereinafter referred to as "processing subsection 70") and the image processing unit 74 of the fine scanned image processing section 66 (which is hereinafter referred to as "processing subsection 74") are the sites where the image (image data) read with the scanner 12 is subjected to specified image processing steps in accordance with the image processing conditions set by means of the conditions setting section 68 to be described later in this specification. In the third aspect of the present invention, if the film to be processed for printing is LF or a film for which the print type is preliminarily set or if the print to be produced is a re-print, the image conditions are preset in accordance with the LF model, print type, film ID or like information which have been acquired by the method of acquiring recorded information according to the second aspect of the present invention and are read out of the internal memory 56 or the external memory 19 by means of the CPU 54 and, hence, specified image processing may be performed in accordance with such image processing conditions that have been read by the CPU 54. Alternatively, specified image processing may be performed in accordance with the image processing conditions that have been read by the CPU 54, sent to the conditions setting section 68 and set in that section. The two image processing units 70 and 74 perform basically the same processing except that the image data to be processed have different pixel densities.

The image processing steps to be performed in the processing subsection 70 and the processing subsection 74 may be exemplified by, for example, color balance adjustment, contrast correction (gradation adjustment), brightness correction, dodging (compression/expansion of the density's dynamic range), saturation correction and sharpening. In the present invention, these steps may be replaced or supplemented by the correction of at least one aberration selected from among lateral chromatic aberration, distortion, decrease in the brightness of the edge of image field and defocusing (point spread function or PSF), as well as the finishing of a print type without regard to film type as exemplified by image processing for finishing the image on a color film to a black-and-white image or a sepia image, and image processing for producing the same image as in simultaneous or previous print. These steps may be performed by any known methods comprising suitable combinations of arithmetic operations, processing with a LUT (lookup table), matrix (MTX) operations, filtering and so forth; in the illustrated case, color balance adjustment, brightness correction and contrast correction are performed with LUTs and saturation correction with MTX. Sharpening, dodging and other steps are performed in blocks 71 and 75 in response to an operator's command or in accordance with the image data to be processed and so forth.

In the illustrated case, an aberration correcting part 76 for correcting either lateral chromatic aberration or distortion or both and for performing electronic scaling is provided between the MTX and the block 75 in the fine scanned data processing subsection 74. The aberration correcting part 76 is supplied with lens characteristics data as read by the CPU 54 from the internal memory 56 or the external memory 19 in accordance with the acquired information about camera or LF (particularly their model, lens type or lens characteristics data type) or the lens characteristics data directly acquired from the novel code NC on the LF.

We first describe the third aspect of the present invention, particularly its first embodiment relating to the image processing for the case where the film to be processed for printing is LF and the information about the LF model has been acquired by the scanner 12. Hence, the following description concerns the aberration correcting part 76 which performs both the correction of lateral chromatic aberration and distortion.

In the processor 14 of the embodiment under consideration, the information about the LF model as read from the novel code NC by means of the bar code reader 38 in the scanner 12 is sent to the CPU 54 from the controller 46 via the CPU bus 80, whereupon the CPU 54 reads the corresponding lens characteristics data (as associated with the information about the LF model) out of the internal memory 56 or the external memory 19 and said data is supplied into the aberration correcting part 76.

In the illustrated image processing apparatus 14, even a film on which the novel code NC has not been recorded can be corrected for the lens aberrations that result from the specific camera used in taking the picture on the film. The method of acquiring the necessary information such as the camera or LF model is not limited in any particular way and various methods may be employed; for example, the operator asks for the necessary information from the user and enters it through manipulation of keys; if the film to be processed is 240 film Fa, the operator acquires the necessary information from the recorded magnetic information or he looks at the film ID on the film and enters it through manipulation of keys, whereupon the CPU 54 reads the corresponding camera information (as associated with the entered film ID) out of the memory 56 or 19, thereby allowing the operator to acquire the necessary information.

In the processor 14 of the present invention, particularly in the case where the film F to be processed is LF, the image recorded on the film F is corrected, as need arises, for lateral chromatic aberration and distortion in the aberration correcting part 76 by image processing using the lens characteristics and the position information of the image to be processed, thereby enabling consistent outputting of prints that reproduce a high-quality image free from color mismatch and distortion.

The lens characteristics data to be supplied into the aberration correcting part 76 includes the information about lens characteristics that are associated with the models of various types of camera and LF, specifically the information about the characteristics of the lateral chromatic aberrations and distortions of various types of lens. The lens characteristics are by no means limited to those stored in the internal memory 56 as lens characteristics data or in the external memory 19 connected to the printer 10 as data base; alternatively, they may be supplied externally during reading of the film F as the corresponding lens information (associated with the film F).

The lens characteristics are not limited in particular way. However, the characteristics of lateral chromatic aberration and distortion of a lens can generally be approximated to a reasonable extent by cubic functions using as a parameter the distance from the optical axis of the lens, namely, the center of the image recorded on the film F (which is typically expressed as x-y). Therefore, a function representing the lateral chromatic aberration of each camera species that need be corrected for lateral chromatic aberration, as well as a function representing the distortion of that camera may be stored as information about aberrational lens characteristics.

Using the information about the taking lens characteristics of the film F fed from the CPU 54 and the position information for the image data (pixel) that has been read from the fine scan memory 62 and which has been subjected to various image processing steps, said image data typically indicating the position of pixel coordinates (how many pixels are there as counted from the center pixel), the aberration correcting part 76 not only corrects the lateral chromatic aberration and distortion of the lens but also performs electronic scaling. The coordinates of a pixel may be x-y coordinates or polar coordinates. The position information for the image data is not limited to that which is referenced to the center of the image and various other references may be substituted, such as a corner of the image (e.g. the upper left corner), a particular pixel (e.g. the pixel assigned with pix No. 1), as well as an area exterior to the image, for example, perforations in the film F. In other words, various kinds of position information may be used in the present invention as long as the relative position of the image (pixel) can be detected.

It should be noted that if lateral chromatic aberration and distortion are corrected separately using the lens characteristics and the position information for the image (which is hereinafter referred to as "pixel position"), much time is required to perform mathematical operations and, in addition, mathematical operations for interpolation must be performed several times, which lead to image deterioration.

The present invention preferably deals with this problem by correcting the distortion after correcting the lateral chromatic aberration using one of the three primaries R, G and B, typically G, as a reference color; in this case, the image magnifications of R and B are converted such that the R and B images match the G image, whereupon the lateral chromatic aberration is corrected. On the basis of the corrected aberrations, the appropriate position of each pixel is calculated and mathematical operations are accordingly performed to interpolate the image data for the respective pixels, thereby producing image data that has been corrected for the lateral chromatic aberration and distortion of the image recorded on the film F.

For correcting the distortion in this method, one only need perform arithmetic operations on the G image. Therefore, both lateral chromatic aberration and distortion can be corrected very efficiently with reduced numbers of arithmetic operations and those for interpolation.

An image processing apparatus usually performs electronic image scaling (i.e., enlarges or contracts the image) by processing image data so that the image (image data) is adjusted to the size of an output image before it is delivered from the apparatus. The electronic scaling of the image is usually performed by arithmetic operations of the image data for interpolation.

A problem with this approach is that two interpolations are performed (arithmetic operations for interpolation have already been performed to correct the lateral chromatic aberration and distortion), which frequently results in image deterioration.

In a particularly preferred embodiment, the present invention deals with this problem by the following approach: using the aforementioned lens characteristics and pixel position for the image data, the appropriate positions of individual pixels are calculated from an offset in the pixel positions of R and B from the reference color (G) that has been caused by lateral chromatic aberration and an offset in the pixel position of the reference color due to distortion, and using the information about the thus calculated appropriate positions of the pixels, the image data is interpolated to perform electronic scaling of the image. In other words, the positions in which the individual pixels should inherently be located are predicted by calculating the offsets in pixel position due to lateral chromatic aberration and distortion and in accordance with the thus predicted appropriate positions, arithmetic operations for interpolation are performed on the image data, thereby accomplishing the intended electronic scaling.

This way, the correction of lateral chromatic aberration and distortion and the electronic scaling can be accomplished by performing a single sequence of arithmetic operations for interpolation.

The illustrated aberration correcting part 76 is a site where both the correction of lateral chromatic aberration and distortion and the electronic scaling are performed by the above-described method. As shown in conceptual form in FIG. 8, the aberration correcting part 76 comprises a coordinates transforming section 76A and an enlarging/contracting section 76B.

In FIG. 8, ir, ig and ib each represent the pixel position (address) of image data (input image data) supplied from MTX; Ir, Ig and Ib each represent the pixel position for the image data that has been corrected for lateral chromatic aberration and distortion; Δr and Δb represent offsets (the amounts of correction) in the pixel positions of R and B, respectively, from the pixel position of G that have been caused by lateral chromatic aberration; and D represents an offset in the pixel position of G due to distortion.

When the aberration correcting part 76 is supplied with the image data from MTX, the coordinates transforming section 76A, using the lens characteristics from the CPU 54, calculates the offsets Δr and Δb due to lateral chromatic aberration from ig, the pixel position of image data G, at ir and ib, respectively, which represent the pixel positions of the image data R and B, as well as calculating the offset D of ig (the pixel position of the input image data G) due to distortion.

The subsequent operations are also clear from FIG. 8; Δr and D are added to ir, or the position of each pixel in the input image data R, so as to calculate Ir, or the pixel position for the image data R that has been corrected for lateral chromatic aberration and distortion; Δb and D are added to ib, or the position of each pixel in the input image data B, so as to calculate Ib, or the pixel position for the image data B that has been corrected for lateral chromatic aberration and distortion; then, D is added to ig, or the position of each pixel in the input image data G, so as to calculate Ig, or the pixel position for the image data G that has been corrected for lateral chromatic aberration and distortion.

Thus, in these calculations, the lateral chromatic aberrations of the R and B images are corrected with reference to the G image so that the overall image is brought into registry with the G image; on the other hand, the offset D in the G image due to distortion is used to correct the overall distortion, thereby calculating the pixel positions that have been corrected for the lateral chromatic aberrations and distortions of the respective images R, G and B.

The process then goes into the enlarging/contracting section 76B, where image scaling is performed by interpolation (N-fold interpolation) of the image data in accordance with a desired ratio of enlargement or contraction using the pixel positions Ir, Ig and Ib that have been corrected for lateral chromatic aberration and distortion. Thus, image data that has been corrected for lateral chromatic aberration and distortion and which has been scaled electronically is outputted to the block 75. The method of electronic scaling is not limited to any particular type and various known methods may be employed, as exemplified by the use of bilinear interpolation and spline interpolation.

It should be noted here that if no lens characteristics data is supplied from the CPU 54 or if a command is issued for cancelling the correction of lateral chromatic aberration and distortion, the aberration correcting part 76 performs only electronic scaling in the enlarging/contracting section 76B and the resulting image data is supplied into the block 75. If the image processing apparatus 14 is of such a type that the correction of lens aberrations is not performed or unnecessary, a scaling ratio converting section may be substituted for the aberration correcting part 76.

The illustrated apparatus assumes a preferred embodiment in which both distortion and lateral chromatic aberration are corrected in the aberration correcting part 76. This is not the sole case of the present invention and the characteristic of either lateral chromatic aberration or distortion may be stored as a lens characteristic and used in combination with pixel positions to correct only the associated aberration.

In this alternative case, the appropriate position that has been corrected for the offset due to lateral chromatic aberration or distortion may be calculated and subsequently used to correct the corresponding aberration, followed by electronic scaling in accordance with a known method. Preferably, the above-mentioned procedure is adopted; the appropriate position that has been corrected for the offset due to lateral chromatic aberration or distortion is calculated and the information on the thus calculated appropriate position is used in interpolating the image data to perform electronic scaling, thereby accomplishing both aberrational correction and electronic scaling. This procedure is similarly effective in sufficiently reducing the number of arithmetic operations for interpolation to attenuate the image deterioration due to interpolation.

In addition to the information about at least one aberration selected from between distortion and lateral chromatic aberration, the information about lens-induced defocusing (PSF) may also be stored so that not only the distortion and/or lateral chromatic aberration but also the defocusing is corrected.

Besides these kinds of information, the degree of decrease in the brightness of the edge of image field (the ratio in the quantity of light between the center and the edge of image field), the deterioration of MTF (modulation transfer function) and the reduction of contrast that are caused by the camera, lens and the lens of LF and any other information may be stored in the external memory 19 or internal memory 56 either as such or in association with the model of LF, lens type and the type of lens characteristics data so that the necessary correction is made for the brightness of the edge of image field, MTF or contrast.

If desired, the information about graininess due to the film F (Fa) may be stored to provide for the correction of graininess.

The image data processed in that processing subsections 70 and 74 is sent to the image data converting subsections 72 and 78.

The image data converting subsection 72 of the prescanned image processing section 64 is a site where the image data processed by the processing subsection 70 is converted with a 3D (three-dimensional) LUT or the like into image data corresponding to the representation on the display 20. The image data converting subsection 78 of the fine scanned image processing section 66 is a site where the image data processed by the processing subsection 74 is similarly converted with a 3D LUT into image data that is subsequently supplied into the printer 16 as image data corresponding to image recording with the printer 16.

The conditions for various processing steps that are to be performed in the prescanned image processing section 64 and the fine scanned image processing section 66 are set by the conditions setting section 68. As shown, the conditions setting section 68 comprises an image processing conditions setting subsection 82, a key correcting subsection 84 and a parameter coordinating subsection 86.

The image processing conditions setting subsection 82 (hereinafter referred to as "setting subsection 82") selects a particular image processing step to be performed; it uses the prescanned data to set the conditions for image processing to be done in the processing subsections 70 and 74 and supply them to the parameter coordinating subsection 86.

Specifically, the setting subsection 82 uses the prescanned data to perform various operations including the construction of density histograms and calculation of various image characteristic quantities such as average density, LATD (large-area transmission density), highlight (minimum density) and shadow (maximum density). In addition, in response to commands optionally entered by the operator using the manipulative unit 18, the setting subsection 82 determines the image processing conditions as by constructing tables (LUT) for the aforementioned gray balance adjustment, brightness correction and contrast correction, as well as the construction of operational matrices for saturation correction.

The key correcting subsection 84 calculates the amounts of adjustment of image processing conditions (e.g. the amount of correction of LUT) typically in accordance with various commands entered by manipulation of keys for adjusting the brightness, color, contrast, sharpness, saturation and so forth that have been set in the keyboard 18a or by the mouse 18b; the key correcting subsection 84 then supplies the calculated amounts of adjustment into the parameter coordinating subsection 86.

After receiving the image processing conditions set by the setting subsection 82, the parameter coordinating subsection 86 sets the supplied image processing conditions in the processing subsection 70 of the prescanned image processing section 64 and the processing subsection 74 of the fine scanned image processing section 66. Further, in accordance with the amounts of adjustment calculated by the key correcting subsection 84, the parameter coordinating subsection 86 either corrects (adjusts) the image processing conditions set in various parts or makes another setting of image processing conditions.

As will be described later in this specification, if the novel code NC as encoded in the controller 46 in the scanner 12 by optical reading with the bar code reader 38 or converted to data by optical reading with the CCD sensor has been transmitted to the image processing apparatus 14, the CPU 54 acquires additional information such as the film ID or print type out of the memory 19 or 56; in accordance with the acquired film ID, the CPU 54 then retrieves from the memory 19 or 56 the image processing conditions that are the same as those employed in simultaneous or previous printing; alternatively, in accordance with the acquired print type, the CPU 54 reads from the memory 19 or 56 the image processing conditions for monotone finishing such as sepia finishing or black-and-white finishing; these image processing conditions are supplied to the parameter coordinating subsection 86 in place of the image processing conditions that have been set by means of the setting subsection 82. In the case just described above, the setting of image processing conditions by means of the setting subsection 82 need not be performed but, if necessary, this may be performed.

In still another case, if the image processing conditions set on the basis of the scanned image data by means of the setting subsection 82 are replaced by the image processing conditions set in accordance with additional information such as film ID or print type, the substitute image processing conditions may be set by being directly supplied into the processing subsection 70 of the prescanned image processing section 64 and the processing subsection 74 of the fine scanned image processing section 66 so that the setting per se of the image processing conditions by the conditions setting section 68 can entirely be omitted.

On the pages that follow, we describe the operation of the processor 14 which implements the image processing method according to the first embodiment of the third aspect of the present invention.

When the prescanned data is stored in the prescan memory 60 as described above, the setting subsection 82 reads the stored data and performs the necessary operations including the construction of density histograms, calculation of image characteristic quantities; the setting subsection 82 uses such density histograms, image characteristic quantities and other parameters to set the image processing conditions (i.e. construct LUT and MTX) and send them to the parameter coordinating subsection 86.

In parallel with this procedure, the conditions for fine scan reading are set as by determining the value to which the variable diaphragm 24 is stopped down; this provides for adjustment of the scanner 12. Subsequently, the scanner 12 performs fine scan and the fine scanned data are sequentially transferred to and stored in the fine scan memory 62.

The processor 14 is also supplied with various kinds of commands and information that have been entered by manipulation of the keyboard 18a and the mouse 18b and the magnetic information that has been read from the film F with the scanner 12 (particularly the carrier). If information about the camera or LF model or lens type or lens characteristics data are entered as the result of acquisition by the bar code reader 38 or the magnetic head 40 on the scanner 12 in the manner already described above, the CPU 54 reads out of the memory 19 or 56 the corresponding lens characteristics data that is associated with the acquired information about model or lens type or the type of the lens characteristics data; alternatively, the acquired information or data is directly supplied to the aberration correcting part 76 of the processing subsection 74 of the fine scanned image processing section 66.

Upon receiving the image processing conditions, the parameter coordinating subsection 86 sets them in a specified site (hardware) in the processing subsection 70 of the prescanned image processing section 64 and in the processing subsection 74 of the fine scanned image processing section 66.

Subsequently, the prescanned data is read from the prescan memory 60, processed under the image processing conditions set in the processing subsection 70 and converted in the image data converting subsection 72; the prescanned image thus subjected to the specified processing is then represented on the display 20. If necessary, the image to be represented on the display 20 may be corrected for any lateral chromatic aberration and distortion in the same manner as already described above.

Looking at the representation on the display 20, the operator checks (verifies) the image, or the result of the processing, and if necessary, manipulates the aforementioned keys on the keyboard 18a or the mouse 18b to adjust the color/density, gradation and other features of the image.

The inputs for this adjustment are sent to the key correcting subsection 84 which, in response to the entered inputs for adjustment, calculates the amounts of correction of the image processing conditions and sends them to the parameter coordinating subsection 86. In response to the supplied amounts of correction, the parameter coordinating subsection 86 corrects the LUTs and MTXs in the processing subsections 70 and 74, respectively, as already described above. The image represented on the display 20 also varies in response to this corrective measure, or the inputs for adjustment entered by the operator.

If the operator concludes that the image represented on the display 20 is appropriate (verification OK), he manipulates the keyboard 18a or the mouse 18b to give a command for print start, whereupon the image processing conditions are finalized and the fine scanned data is read from the fine scan memory 62 and sent to the processing subsection 74 of the fine scanned image processing section 66.

In the processing subsection 74, the image data is processed by the LUT and MTX and thereafter sent to the aberration correcting part 76. In a separate step, the lens characteristics data associated with the camera or LF model or lens characteristics acquired by the scanner 12, namely, the corresponding lens characteristics data, is read by the CPU 54 and supplied to the aberration correcting part 76.

In the coordinates transforming section 76A of the aberration correcting part 76, Ir, Ig and Ib which represent the pixel positions that have been corrected for either lateral chromatic aberration or distortion or both are calculated in the manner described above on the basis of the lens characteristics and the pixel positions for the image data. The calculated pixel positions Ir, Ig and Ib are sent to the enlarging/contracting section 76B. Using the supplied pixel positions Ir, Ig and Ib, the enlarging/contracting section 76B electronically scales the image by performing N-fold interpolation of the image data in accordance with the ratio of enlargement or contraction and the resulting image data that has been corrected for lateral chromatic aberration and distortion and which has been subjected to electronic scaling is then sent to the block 75.

It should be noted that the calculation of the pixel positions Ir, Ig and Ib in the coordinates transforming section 76A may be performed prior to the supply of the image data at the time when the information about the lens characteristics is received from the CPU 54.

In the block 75, the image data is subjected to sharpening, dodging and any other necessary image processing steps before it is sent to the image data converting subsection 78, where it is converted to image data suitable for image recording with the printer 16. The thus converted image data is then sent to the printer 16.

If no image verification is to be performed, the image processing conditions are finalized at the point of time when the parameter coordinating subsection 86 ends setting of the image processing conditions in the processing subsection 74 of the fine scanned image processing section 66, and the fine scanned data is automatically processed and sent to the printer 16.

The above described alternative procedures are preferably selected in terms of operating modes or the like.

As already mentioned, the image data processed in the processor 14 is sent to the printer 16.

The printer 16 records a latent image by exposing a light-sensitive material (photographic paper) in accordance with the image data, performs development and any other necessary processing in accordance with the light-sensitive material and outputs it as a (finished) print. To give one example, the light-sensitive material is cut to a specified length in accordance with the size of the final print; thereafter, the printer 16 records a back print and three light beams for exposure to red (R), green (G) and blue (B) in accordance with the spectral sensitivity characteristics of the light-sensitive material (photographic paper) are modulated in accordance with the image data (the image to be recorded); the three modulated light beams are deflected in a main scanning direction and, at the same time, the light-sensitive material is transported in an auxiliary scanning direction perpendicular to the main scanning direction so as to record a latent image; the light-sensitive material having the latent image recorded thereon is subjected to a wet development process comprising color development, bleach-fixing and rinsing; the thus processed light-sensitive material is dried to produce a print; a plurality of prints thus produced are sorted in a stack tray.

Described above is the basic composition of the image processing method according to the first embodiment of the third aspect of the present invention.

We now describe an image processing method according to the second embodiment of the third aspect of the present invention.

Simultaneous printing by the image processing method is considered first. In a mode of reading the image on the film F (Fa) with the scanner 12, for example, in a prescan mode, the novel code NC is optically read with the bar code reader 38 to acquire the film-characteristic identification number (i.e. film ID). At the same time, the image in one frame of the film is optically read with the area CCD sensor 34 (or line CCD sensor 48) to acquire the prescanned image data. On this occasion, the frame number for the image in the thus read scanned prescanned data or a code specifying that frame is also acquired (the following description assumes that the frame number is acquired).

In the next step, the prescanned image data is sent to the image processing apparatus 14 and on the basis of this prescan data, the conditions for image reading during fine scan and printing conditions such as set-up conditions and image processing conditions (the setting of the types and identities of the specific image processing steps to be performed, as well the types and parameters of LUT and MTX to be used in image processing, and so forth) are calculated and set in the conditions setting section 68. Subsequently, the image in the frame of interest of the film F is read by fine scan with the scanner 12 under the fine scan reading conditions set in the conditions setting section 68. Thereafter, the fine scan data is transmitted to the image processing apparatus 14, where it is subjected to image processing, with any necessary correction being done by manipulation of keys, under the printing conditions such as set-up and image processing conditions that have been set in the fine scan data, whereby output image data is acquired for outputting to the printer 16. The acquired output image data is outputted to the printer 16 which, on the basis of the supplied output image data, performs exposure and development of photographic paper, which is then delivered as a finished print (simultaneous print).

At the same time, the film ID and frame number acquired by the scanner 12 and the conditions for the printing applied to the data read for the image in the frame of interest in the processor 14 are stored by the CPU 54 into the external memory 19 or the internal memory 56.

The above process is substantially repeated for making a re-print. The novel code NC on the film F is read with the bar code reader 38 on the scanner 12 to acquire the film ID. The frame number is similarly acquired from the expanded DX code DXe and the like. Thus, prescanned image data is acquired by the scanner 12. On the basis of the thus acquired prescan data, the conditions setting section 68 calculates the image reading conditions for fine scan and the conditions for printing with the prescan data.

The film ID is read with the bar code reader 38, transmitted from the controller 46 into the image processing apparatus 14 and fed into the CPU 54. In accordance with the film ID, the CPU 54 reads out the external memory 19 or internal memory 56 the printing conditions for making a simultaneous print or previous print of the image in the frame of interest, as exemplified by the set-up conditions and image processing conditions (which include the types and identities of the specific image processing steps to be performed, as well as parameters including LUT and MTX). These printing conditions are represented on the display 20 or the like together with or separately from the prescanned image.

The printing conditions for making the simultaneous print or previous print (the following description assumes the making of a simultaneous print) that have been thusly read by the CPU 54 or represented on the display 20 are compared by the operator with the user's order for making a re-print. If the two sets of conditions are found to be the same, the conditions for simultaneous printing are set in the conditions setting section 68 as those for re-printing. Otherwise, the operator determines as to whether it is necessary to change the simultaneous printing conditions. If it is found that there is no need to change the simultaneous printing conditions, they are set as the re-printing conditions in the conditions setting section 68. If it is found that the simultaneous printing conditions need be changed, the user's order for re-printing, the printing conditions based on the prescan data that have been calculated by the conditions setting section 68, and so forth are referenced and in order to ensure image processing under conditions comparable to the simultaneous printing conditions, the available simultaneous printing conditions are changed by appropriate arithmetic operations, as by changing the sharpness parameter in accordance with the print size if the difference concerns it; the result of this change is set in the conditions setting section 68 as the conditions for making a re-print.

In a separate step, on the basis of the image reading conditions for fine scan that have been set by the conditions setting section 68, the scanner 12 performs fine scan of the image in the frame of interest of the film F so as to acquire the fine scanned image data. The thus acquired fine scanned image data is transmitted to the image processing apparatus 14, processed by the data processing section 58 and stored temporarily in the fine scan frame memory 62 before it is read out again. In the processing unit 74 of the fine scanned image processing section 66, the fine scanned image data is subjected to image processing under the re-printing conditions set in the conditions setting section 68, thereafter, the fine scanned image data is sent to the image data converting subsection 78, where it is converted to output image data suitable for the printer 16.

The thus acquired output image data is delivered to the printer 16 which, in accordance with the output image data, performs exposure and development of photographic paper, which is produced as a finished re-print.

The thus obtained re-print has been subjected to image processing under the re-printing conditions that are identical or equivalent to the simultaneous or previous printing conditions or which have been rendered comparable by appropriate arithmetic operations. Hence, the re-print is finished to have an image that is identical, equivalent or comparable to the image in the simultaneous or previous print and, in particular, the two prints are identical or equivalent in color and density. Thus, it is possible to achieve an agreement between the re-print and the simultaneous or previous print.

The foregoing description assumes that the operator compares the simultaneous (or previous) printing conditions with the user's order for making a re-print and determines as to whether there is a need to change the simultaneous (or previous) printing conditions. This is not the sole case of the present invention and details of the order for re-print may be entered by the operator into the image processing apparatus 14 so that automatic comparison and determination can be made. In the foregoing case, the image reading conditions for fine scan are set on the basis of the prescan data but this is not the sole case of the present invention and the image reading conditions for fine scan may be automatically read from the printing conditions that have been read using the film ID.

Described above is the basic composition of the image processing method according to the second embodiment of the third aspect of the present invention.

We now describe an image processing method according to the third embodiment of the third aspect of the present invention. In this embodiment, as in the already described first and second embodiments, the novel code NC recorded on the film F is read with the bar code reader 38 on the scanner 12 to acquire the print type number. The print type assigned to the acquired number is read out of the external memory 19 or the internal memory 56 by means of the CPU 54 in the image processing apparatus 14. The CPU 54 also reads printing conditions such as set-up and image processing conditions that are associated with the print type and sets them in the conditions setting section 68.

In a separate step, the image data for each frame is read with the scanner 12 and the resulting fine scanned image data is transmitted to the image processing apparatus 14, processed by the data processing section 58 and stored temporarily in the fine scan memory 62 before it is read out again. In the processing unit 74 of the fine scanned image processing section 66, the fine scanned image data is read by the CPU 54 and subjected to image processing, typically under the image processing conditions associated with the intended print type that have been set by the conditions setting section 68. Consider, for example, the case where the intended print type is a black-and-white print. The R, G and B data for each pixel are averaged and the resulting averaged data $D_A$ is substituted for the R, G and B data for the pixel of interest ($R=G=B=D_A$). Thereafter, the image processing necessary for producing a black-and-white print is performed under the image processing conditions set by the conditions setting section 68. If the intended print type has a sepia color, the same procedure may of course be repeated, except that the required image processing is performed after the RGB image data of three primary colors for each pixel is converted to the corresponding data compatible with the finishing to a sepia color.

Thus, output image data is obtained after image processing is performed in accordance with the intended print type in the processor 14. The output image data is then delivered to the printer 16 which, in accordance with the output image data, performs exposure and development of photographic paper, which is produced as a finished print.

The thus obtained print is not dependent on the film type, so both a color print and a monotone print such as a black-and-white print or a sepia print can be finished from color negative films. This eliminates the need to provide dedicated films and photographic paper that are compatible with different print types and the types of films and photographic paper that have to be made available can be sufficiently reduced to provide ease in inventory control and keep the processing cost down. With conventional films, the package, a cassette or some other container of a color film may be given an indication of the type of a monotone print as a finished print that differs from the film type (as exemplified by a black-and-white print or sepia print) so that the type of the finished print can be designated and set independently of the film type. This is not possible with a film that is cut into pieces after development since the film per se does not provide a clue to identify the designated type of the finished print. In contrast, the photographic film with recorded information according to the first aspect of the present invention provides by itself a clue to identify the designated type of the finished print, so even a film cut to pieces can be finished to the intended print type in an easy and positive way.

Described above is the basic composition of the image processing method according to the third embodiment of the third aspect of the present invention.

In the various cases described above, the diverse kinds of data necessary for implementing the image processing method according to the third aspect of the invention, as exemplified by the model of a film with lens, the lens type, lens characteristics associated with the lens characteristics data, the simultaneous or previous printing conditions associated with the film-characteristic identification number and the printing conditions associated with the intended print type may all be stored in the internal memory 56 if it has a sufficiently large capacity, so that said data is readily available for access by the CPU 54. However, this approach increases the volume of the data that has to be processed and a more preferred method is by storing the above-mentioned data in the external memory 19 as a database and downloading it to the internal memory 56 as need arises so that it becomes available for access by the CPU 54.

In the above-described cases, the printing conditions (image processing conditions and exposing conditions) for making the simultaneous or previous print are stored as a database in the external memory 19 in accordance with data such as the film-characteristic identification number. This is not the sole case of the present invention and in addition to or in place of the printing conditions, the image data may itself be stored as a database in the external memory 19. If the image data is to be stored in the external memory 19 in place of the printing conditions, the latter may be determined from the image data read from the external memory 19. Hence, the image data to be stored in the external memory 19 needs only to have a sufficient volume to permit the calculation or determination of the printing conditions. Prescanned image data may be stored in the external memory 19. Alternatively, fine scanned data may be stored after portions of it are removed to provide data having a desired pixel density, say, a pixel density comparable to that of the prescanned image data. Needless to say, if the external memory 19 has a very large capacity, the fine scanned image data may itself be stored in the external memory 19. In this case, there is no need to read the image from the film and so forth; portions of the fine scanned data may be removed before it is used in calculating or determining the print conditions and so forth and the fine scanned image data may be used as such in the image processing of the printing image data.

While the photographic film with recorded information, the method of acquiring the information recorded on a photographic film, the image processing method using the acquired information and the print system implementing this image processing method according to the first, second, third and fourth aspects, respectively, of the present invention have been described above in detail, it should be noted that the invention is by no means limited to the examples described above and various improvements and modifications can of course be made without departing from the scope and spirit of the invention.

As described on the foregoing pages in detail, according to the first aspect of the present invention, information such as the model of a film with lens, the date of manufacture of the film, the film-characteristics identification number and the print type that are useful in specifying the image exposing conditions and the image processing conditions in addition to the photographic film type, manufacturer's name and the frame number that are contained in standardized bar codes such as the conventional DX bar code and expanded DX bar code can be easily acquired from a novel bar code that applies the standardized bar code system and suffices to be read optically as in the case of reading the standardized bar codes.

According to the first aspect of the present invention, the coding system for the existing standardized bar codes is applied, so there is no need to create an entirely new bar code system. Another advantage of the first aspect of the invention is that the novel bar code can be read with a conventional photoprinter after simple and minor changes in the bar code reader and the associated reading software. Hence, according to the first aspect of the invention, a conventional photoprinter can be used without making any substantial improvements or extensive changes. A further advantage resulting from the application of the existing standardized bar code is that the novel bar code can be printed on a photographic film without introducing extensive changes but by merely reversing the printing pattern.

According to the second aspect of the present invention, the novel bar code recorded on the photographic film of its first aspect can be easily read without making any substantial or extensive changes to a conventional scanner but by merely making small and minor changes in the bar code reader in the scanner and the associated reading software; as a result, the additional information represented by the novel bar code can be easily acquired.

According to the third aspect of the present invention, the additional information acquired by the above-stated method of acquiring the information recorded on a photographic film is used to ensure that the specified image processing set by that information can be performed in an easy and positive way.

In particular, according to the first embodiment of the third aspect of the invention, even the image recorded on a film with lens of low performance can be corrected for the lateral chromatic aberration, distortion, decrease in the brightness of the edge of image field, blurring and other aberrations in the image by image processing to ensure the consistent outputting of high-quality images without color mismatch and distortion.

According to the second embodiment of the third aspect of the invention, the making of a re-print can be performed by image processing that is identical, equivalent or comparable to that employed for the making of a simultaneous or previous print; hence, there can be achieved consistent outputting of re-prints that are finished to have a complete or substantial agreement with the simultaneous or previous print, particularly in color and density.

According to the third embodiment of the third aspect of the invention, image processing for producing a print in a specified print type can be performed independently of the film type, thus making it possible to produce a finished print of a different type than the film type. Therefore, according to the third embodiment, films of the same type can be applied without regard to the print type as exemplified by the use of color films to produce black-and-white prints or prints finished to a monotone such as sepia. Hence, there is no need to provide dedicated monotone films such as black-and-white films for printing in black and white and dedicated films for printing in sepia and this provides ease in inventory control and keeps down the processing cost. A further advantage of the third embodiment of the third aspect of the invention is obvious when applying a film of the same type as the intended print as in the case of applying a color film to the finishing in a monotone such as black and white or sepia by indicating the finished print type on the film package or cassette. Even if the developed film is cut into pieces (sleeves) to make it impossible to have a visual check of the indication, there is no likelihood for making a mistake about the finished print type but prints of the finished print type according to the predetermined settings can be outputted in a consistent manner.

In the fourth aspect of the present invention, the photographic film with recorded information according to its first aspect is used, the method of acquiring recorded information according to the second aspect is implemented, the image processing method according to the third aspect is implemented and the resulting image data subjected to specified processing is used, whereby finished prints that have received the above-described various specified processing steps in an appropriate manner can be outputted consistently.

What is claimed is:

1. An image processing method, comprising:

reading a first bar code containing a first set of film information which is recorded as a latent image between a sequence of perforations and a bottom edge of a photographic film;

reading a second bar code containing a second set of film information that is mutually exclusive from said first set of information, said second bar code recorded as a latent image between said sequence of perforations and a top edge of said photographic film, wherein each of said first and second bar codes have a specified bar code pattern which includes a data track, a clock track, an entry pattern indicating a beginning of a bar code sequence and an exit pattern indicating an end of said bar code sequence, said second bar code oriented at said top edge of said photographic film so that a directional orientation of said data and clock tracks of said second bar code, as the second bar code is read, are reversed relative to the directional orientation of the data and clock tracks of said first bar code, as the first bar code is read, wherein each of said first and second bar codes are read with a single bar code reader having image reading elements arranged in areas therein which correspond to said first bar code and said second bar code;

acquiring said first set of film information read from said first bar code and said second set of film information read from said second bar code with a controller for directing said acquired information to an image processing apparatus;

using said acquired second set of film information; and performing specified image processing steps which are set based on said acquired second set of film information.

2. The image processing method of claim 1, wherein, when said photographic film is a film used with a lens that has information about its camera model, lens type or lens characteristics data recorded as said second set of film information, acquiring, at the time of printing, said said second set of film information; and correcting at least one defect selected from among lateral chromatic aberration, distortion, decrease in the brightness of the edge of image field and blurring using information about image's pixel position and characteristics of a taking lens in accordance with said acquired second set of film information about said camera model, said lens type of said film or its lens characteristics data.

3. An image processing method of claim 1, wherein, when said second set of film information contains a film-characteristic identification number, acquiring, at the time of making a simultaneous print, said film-characteristic identification number as said second set of film information;

storing image data, image processing conditions or printing conditions employed at the time of making a simultaneous re-print in a photoprinter database, said storing based on said film-characteristic identification number;

acquiring, at said time of making a re-print, said film-characteristic identification number recorded in said second bar code;

downloading said image data, image processing conditions or printing conditions from said database that correspond to said acquired film-characteristic identification number; and preparing a finished print based on said downloaded image data, image processing conditions or printing conditions.

4. The image processing method of claim 1, further including:

when said second set of film information recorded in said bar code contains a print type, acquiring, at said time of printing, said print type; and creating a finished print from said acquired print type.

5. The image processing method of claim 1, wherein said second bar code is provided only at said top film edge of the film for each frame of said film, so as to be across from said first bar code that is at said bottom film edge.

6. The image processing method of claim 1, wherein said data track is parallel to said clock track in each of said first and second bar codes, wherein said clock track is closer to the film edge than said data track in said second bar code, and wherein said data track is closer to the film edge than said clock track in said first bar code.

7. The image processing method of claim 6, wherein said orientation of said data and clock tracks enables existing bar code readers to be used without requiring substantial changes in an exposing pattern of the bar codes.

8. A photographic film, comprising:

a central image region;

a sequence of perforations formed at specified intervals outboard of said central image region at opposite sides thereto;

a first bar code recorded as a latent image between said sequence of perforations and a bottom edge of the photographic film and containing a first set of film information; and a second bar code containing a second set of film information that is mutually exclusive from said first set of information, said second bar code recorded as a latent image between said sequence of perforations and a top edge of the photographic film, wherein each of said first and second bar codes have a specified bar code pattern that includes a data track, a clock track, an entry pattern indicating a beginning of a bar code sequence and an exit pattern indicating an end of said bar code sequence, said second bar code oriented at said top edge of said photographic film so that a directional orientation of said data and clock tracks of said second bar code, as the second bar code is read, are reversed relative to the directional orientation of the data and clock tracks of said first bar code as the first bar code is read.

9. The photographic film according to claim 8, wherein said second set of information is selected from the group including camera model information, a film-characteristic identification number, a date of film manufacture, a print type camera mode information, lens type of a camera the film was used in, and lens characteristics data of said lens type.

10. The photographic film according to claim 8,
wherein said first bar code is a DX or expanded DX bar code, and
wherein said first set of information contained in said first bar code is selected from the group including film manufacturer, film type, emulsion number and frame number.

11. The photographic film according to claim 8, wherein said second bar code is located in at least one recording site of each frame or on a photographic film cut to a piece, said second bar code located in a location different than said standardized bar code.

12. The photographic film according to claim 9, wherein said print type designates monotone as a condition for producing a finished print.

13. The photographic film according to claim 8, wherein said second bar code is provided only at said top film edge of the film for each frame of said film, so as to be across from said first bar code that is at said bottom film edge.

14. The photographic film according to claim 8,
wherein said data track is parallel to said clock track in each of said first and second bar codes,
wherein said clock track is closer to the film edge than said clock data track in said second bar code, and
wherein said data track is closer to the film edge than said clock track in said first bar code.

15. The photographic film according to claim 14, wherein said orientation of said data and clock tracks enables existing bar code readers to be used without requiring substantial changes in an exposing pattern of the bar codes.

16. A method of sending information recorded in bar codes imprinted on a photographic film to an image processing apparatus, comprising:
reading a first bar code containing a first set of film information which is recorded as a latent image between a sequence of perforations and a bottom edge of the photographic film;
reading a second bar code containing a second set of film information that is mutually exclusive from said first set of information, said second bar code recorded as a latent image between said sequence of perforations and a top edge of the photographic film,
wherein each of said first and second bar codes have a specified bar code pattern which includes a data track, a clock track, an entry pattern indicating a beginning of a bar code sequence and an exit pattern indicating an end of said bar code sequence, said second bar code oriented at said top edge of said photographic film so that a directional orientation of said data and clock tracks of said second bar code, when the second bar code is read, are reversed relative to the directional orientation of the data and clock tracks of said first bar code, as the first bar code is read,
wherein each of said first and second bar codes are read with a single bar code reader having image reading elements arranged in areas therein which correspond to said first bar code and said second bar code; and
acquiring said first set of film information read from said first bar code and said second set of film information read from said second bar code with a controller for directing said acquired information to the image processing apparatus.

17. The method of claim 16, wherein said first bar code and said second bar code are simultaneously read with an image carried on said film by said image reading sensor.

18. The method of claim 16, wherein said bar code reader includes bar code heads arranged in positions therein which correspond to said first bar code and said second bar code.

19. The method of claim 16, wherein said second bar code is provided only at said top film edge of the film for each frame of said film, so as to be across from said first bar code that is at said bottom film edge.

20. The method according to claim 16,
wherein said data track is parallel to said clock track in each of said first and second bar codes,
wherein said clock track is closer to the film edge than said data track in said second bar code, and
wherein said data track is closer to the film edge than said clock track in said first bar code.

21. The method according to claim 20, wherein said orientation of said data and clock tracks enables existing bar code readers to be used without requiring substantial changes in an exposing pattern of the bar codes.

22. A print system, comprising:
an image reading device reading a first bar code containing a first set of film information which is recorded as a latent image between a sequence of perforations and a bottom edge of a photographic film, and reading a second bar code containing a second set of film information that is mutually exclusive from said first set of information, said second bar code recorded as a latent image between said sequence of perforations and a top edge of the photographic film,
wherein each of said first and second bar codes have a specified bar code pattern which includes a data track, a clock track, an entry pattern indicating a beginning of a bar code sequence and an exit pattern indicating an end of said bar code sequence, said second bar code oriented at said top edge of said photographic film so that a directional orientation of said data and clock tracks of said second bar code, as the second bar code is read, are reversed relative to the directional orientation of the data and clock tracks of said first bar code, as the first bar code is read;
an image processing apparatus receiving said first set of film information read from said first bar code and said second set of film information read from said second bar code by said image reading device, said image processing apparatus performing specified image processing steps based on said received second set of film information; and
a photoprinter that exposes an image carried on said photographic film in accordance with said specified image processing steps to output a finished print.

23. The print system of claim 22, said image reading device being a bar code reader including bar code heads arranged in positions therein which correspond to said first bar code and said second bar code.

24. The print system of claim 22, wherein said second bar code is provided only at said top film edge of the film for each frame of said film, so as to be across from said first bar code that is at said bottom film edge.

25. The print system according to claim 22,
   wherein said data track is parallel to said clock track in each of said first and second bar codes,
   wherein said clock track is closer to the film edge than said data track in said second bar code, and
   wherein said data track is closer to the film edge than said clock track in said first bar code.

26. The print system according to claim 25, wherein said orientation of said data and clock tracks enables existing bar code readers to be used without requiring substantial changes in an exposing pattern of the bar codes.

27. A print system, comprising:
   an image reading device reading a first bar code containing a first set of information defined by a first data track and a first clock track, said first set of information recorded as a latent image between a sequence of perforations and a bottom edge of a photographic film, and reading a second bar code containing a second set of information that is mutually exclusive from said first set of information, and which is defined by a second data track and a second clock track, said second set of information recorded as a latent image between said sequence of perforations and a top edge of the photographic film,
   wherein said second bar code is arranged so that relative directional orientation of said second data and clock tracks, as the second bar code is read, are re versed as compared to the first data and clock tracks of said first bar code as the first bar code is read;
   an image processor for receiving said first and second sets of information read from said first and second bar codes by said image reading device for performing specified image processing functions based on said received second set of information; and
   a photoprinter for exposing an image from said photographic film in accordance with said specified image processing functions to output a finished print.

28. The print system of claim 27, wherein said second bar code is provided only at said top film edge of the film for each frame of said film, so as to be across from said first bar code that is at said bottom film edge.

29. The print system according to claim 27,
   wherein said data track is parallel to said clock track in each of said first and second bar codes,
   wherein said clock track is closer to the film edge than said data track in said second bar code, and
   wherein said data track is closer to the film edge than said clock track in said first bar code.

30. The print system according to claim 29, wherein said orientation of said data and clock tracks enables existing bar code readers to be used without requiring substantial changes in an exposing pattern of the bar codes.

* * * * *

UNITED STATES PATENT AND TRADEMARK OFFICE
CERTIFICATE OF CORRECTION

PATENT NO.    : 6,324,345 B1
DATED         : November 27, 2001
INVENTOR(S)   : Jun Enomoto It is certified that error appears in the above-identified patent and that said Letters Patent is hereby corrected as shown below:

Title page,
Item [30], Foreign Application Priority Data", please correct the priority application date from "Dec. 20, 1997" to -- Dec. 10, 1997 --.

Column 30,
Line 1, please delete "said" (second occurrence).
Lines 34 and 35, please change "said bar code" to -- said second bar code --.

Column 31,
Line 42, please delete "clock".

Column 34,
Line 3, please change "re versed" to -- reversed --.

Signed and Sealed this

Twenty-seventh Day of August, 2002

Attest:

JAMES E. ROGAN
Attesting Officer    Director of the United States Patent and Trademark Office